(12) United States Patent
Burridge et al.

(10) Patent No.: US 10,014,031 B2
(45) Date of Patent: *Jul. 3, 2018

(54) SYNCHRONISATION OF AUDIO AND VIDEO PLAYBACK

(71) Applicant: MEWT Limited, London (GB)

(72) Inventors: Ross Burridge, London (GB); Glyn Williams, Sheffield (GB)

(73) Assignee: MEWT Limited, London (GB)

( * ) Notice: Subject to any disclaimer, the term of this patent is extended or adjusted under 35 U.S.C. 154(b) by 420 days.

This patent is subject to a terminal disclaimer.

(21) Appl. No.: 14/703,097

(22) Filed: May 4, 2015

(65) Prior Publication Data
US 2015/0325269 A1 Nov. 12, 2015

(30) Foreign Application Priority Data
May 8, 2014 (GB) .................................. 1408188.9

(51) Int. Cl.
*G11B 27/30* (2006.01)
*G11B 20/00* (2006.01)
(Continued)

(52) U.S. Cl.
CPC .... *G11B 27/3036* (2013.01); *G11B 20/00007* (2013.01); *H04N 21/41407* (2013.01);
(Continued)

(58) Field of Classification Search
CPC ....... H04N 21/41407; H04N 21/41415; H04N 21/4307; H04N 21/4325; H04N 21/4394;
(Continued)

(56) References Cited

U.S. PATENT DOCUMENTS 4,310,854 A  1/1982 Baer .............................. 358/143
5,450,146 A  9/1995 Chedeville et al.
(Continued)

FOREIGN PATENT DOCUMENTS

EP  1 073 030 A2  1/2001
EP  1 185 138 A2  3/2002
(Continued)

OTHER PUBLICATIONS

U.S. Appl. No. 14/703,182, filed May 4, 2015, titled "Synchronisation of Audio and Video Playback," Applicant MEWT Limited.
(Continued)

*Primary Examiner* — Gelek W Topgyal
(74) *Attorney, Agent, or Firm* — Sunstein Kann Murphy & Timbers LLP

(57) ABSTRACT

A method of playing audio content to a viewer in synchronization with a video content. The method comprises receiving and digitizing an ultrasonic signal comprising ultrasonic synchronization signal(s), the ultrasonic synchronization signal(s) comprising a timecode-carrying part that encodes a respective timecode through modulation of ultrasonic carrier signal(s), the ultrasonic synchronization signal(s) comprising further an ultrasonic marker signal conterminous with the timecode-carrying part. The timecode-carrying part is identified based on a received ultrasonic marker signal and decoded to determine the corresponding timecode. The stored audio content is played back from a playback point determined based on the timecode.

49 Claims, 13 Drawing Sheets

(51) Int. Cl.

| | | |
|---|---|---|
| H04N 21/414 | (2011.01) | |
| H04N 21/43 | (2011.01) | |
| H04N 5/935 | (2006.01) | |
| H04N 5/932 | (2006.01) | |
| H04N 21/432 | (2011.01) | |
| H04N 21/81 | (2011.01) | |
| H04N 21/439 | (2011.01) | |
| G10L 19/018 | (2013.01) | |

(52) U.S. Cl.
CPC ... *H04N 21/41415* (2013.01); *H04N 21/4307* (2013.01); *H04N 21/4325* (2013.01); *H04N 21/4394* (2013.01); *H04N 21/8106* (2013.01); *G10L 19/018* (2013.01); *G11B 2020/00014* (2013.01); *G11B 2020/00072* (2013.01)

(58) Field of Classification Search
CPC .. H04N 21/8106; H04N 21/43; G10L 19/018; G10L 2020/00014; G10L 2020/00072; G10L 20/00007; G10L 27/3036; G10L 27/10
USPC .......................................................... 386/201
See application file for complete search history.

(56) References Cited

U.S. PATENT DOCUMENTS

| | | | |
|---|---|---|---|
| 5,619,582 A | 4/1997 | Oltman et al. | |
| 5,877,842 A | 3/1999 | Gibbens et al. | |
| 6,417,910 B1 | 7/2002 | Mead | |
| 6,483,568 B1 | 11/2002 | Folio | |
| 7,027,429 B2 | 4/2006 | Laroia et al. | 370/350 |
| 8,385,814 B2 * | 2/2013 | Sanders | G08C 25/02 |
| | | | 455/3.01 |
| 8,854,985 B2 * | 10/2014 | Tsfaty | H04B 11/00 |
| | | | 370/247 |
| 2002/0013698 A1 | 1/2002 | Vaudrey et al. | |
| 2002/0196731 A1 | 12/2002 | Laroia et al. | |
| 2003/0002689 A1 | 1/2003 | Folio | |
| 2003/0036391 A1 | 2/2003 | Jordan | |
| 2003/0104824 A1 | 6/2003 | Hale et al. | |
| 2004/0128702 A1 | 7/2004 | Kaneko | |
| 2004/0139482 A1 | 7/2004 | Hale et al. | |
| 2006/0087458 A1 | 4/2006 | Rodigast et al. | |
| 2006/0256287 A1 | 11/2006 | Jacobs | 352/85 |
| 2007/0204294 A1 | 8/2007 | Walker et al. | |
| 2008/0279287 A1 | 11/2008 | Asahina | 375/242 |
| 2009/0172028 A1 | 7/2009 | Benitez et al. | |
| 2009/0288132 A1 | 11/2009 | Hegde | |
| 2010/0161436 A1 | 6/2010 | Itskov et al. | |
| 2010/0217414 A1 | 8/2010 | Sanders et al. | 370/350 |
| 2010/0305729 A1 | 12/2010 | Glitsch et al. | |
| 2010/0328419 A1 | 12/2010 | Etter | |
| 2011/0144998 A1 | 6/2011 | Grill et al. | 704/270 |
| 2011/0237951 A1 | 9/2011 | Bandy et al. | |
| 2012/0203363 A1 | 8/2012 | McKenna et al. | 700/94 |
| 2012/0308032 A1 | 12/2012 | Ginn et al. | |
| 2013/0272672 A1 | 10/2013 | Padro Rondon et al. | 386/201 |
| 2014/0040189 A1 | 2/2014 | Cuttner | 707/610 |

FOREIGN PATENT DOCUMENTS

| | | | |
|---|---|---|---|
| EP | 1 340 320 B1 | 9/2003 | |
| EP | 1 464 172 B1 | 10/2004 | |
| EP | 1 729 173 A2 | 12/2006 | |
| EP | 1 924 027 A2 | 5/2008 | |
| EP | 1 998 476 A1 | 12/2008 | |
| KR | 10-0878531 B1 | 1/2009 | ............ H04L 7/00 |
| WO | 2007/001188 A1 | 1/2007 | |
| WO | 2008/059075 A1 | 5/2008 | |
| WO | 2008/157609 A2 | 12/2008 | |
| WO | WO 2012/049223 A2 | 4/2012 | ............ G03B 31/04 |
| WO | 2012/114169 A1 | 8/2012 | |
| WO | 2012/172480 A2 | 12/2012 | |
| WO | 2013/057438 A1 | 4/2013 | |
| WO | WO 2013/153405 A2 | 10/2013 | ............ G10L 19/00 |
| WO | 2014/022135 A2 | 2/2014 | |
| WO | 2014/033570 A1 | 3/2014 | |
| WO | WO 2014/062509 A1 | 4/2014 | |

OTHER PUBLICATIONS

U.S. Appl. No. 14/703,140, filed May 4, 2015, titled "Synchronisation of Audio and Video Playback," Applicant MEWT Limited.
Combined Search and Examination Report dated Nov. 12, 2014, issued in corresponding Great Britain Application No. GB1408188.9, 7 pages.
Intellectual Property Office—Great Britain Combined Search and Examination Report—Application No. GB1408187.1, dated Oct. 31, 2014, 5 pages.
Intellectual Property Office—Great Britain Combined Search and Examination Report—Application No. GB1408188.9, dated Nov. 2014, 7 pages.
Intellectual Property Office—Great Britain Combined Search and Examination Report—Application No. GB1408190.5, dated Nov. 2014, 8 pages.
European Patent Office Extended European Search Report—European Patent Application No. 15166558.5-1905, dated Sep. 7, 2015, 8 pages.
European Patent Office Extended European Search Report—European Patent Application No. 15166557.7-1905, dated Oct. 1, 2015, 12 pages.
European Patent Office Extended European Search Report—European Patent Application No. 15166559.3-1905, dated Oct. 1, 2015, 12 pages.
United States Patent and Trademark Office Notice of Allowance—U.S. Appl. No. 14/703,182, dated Mar. 11, 2016, 35 pages.
3D sound experiments carried out by BBC R&D engineers—BBC News, http://www.bbc.com/news/technology-26958946, p. 1-12.
Combined Search and Examination Report dated Nov. 13, 2014, issued in corresponding Great Britain Application No. GB1408190.5.
Axon, "Audio Watermarking for Second Screen SyncNow © with the Synapse DAW77 Module," Axon Digital Design B.V., www.axon.tv/downloads/25901/AN2012-12Audiowatermarking (SyncNow).pdf, pp. 1-13, May 21, 2012.
Civolution, "Accurately Synchronizing Companion Devices with TV Programs," Civolution, www.civolution.com/fileadmin/bestanden/datasheets/VideoSync -2nd screen.pdf, 2 pages, Jan. 10, 2012.
Smus, "Ultrasonic Networking on the Web," http://smus.com/ultrasonic-networking, 4 pages, Aug. 8, 2013.
European Patent Office, Extended European Search Report—European Patent Application No. 15166559.1-1905, dated Oct. 1, 2015, 12 pages.

* cited by examiner

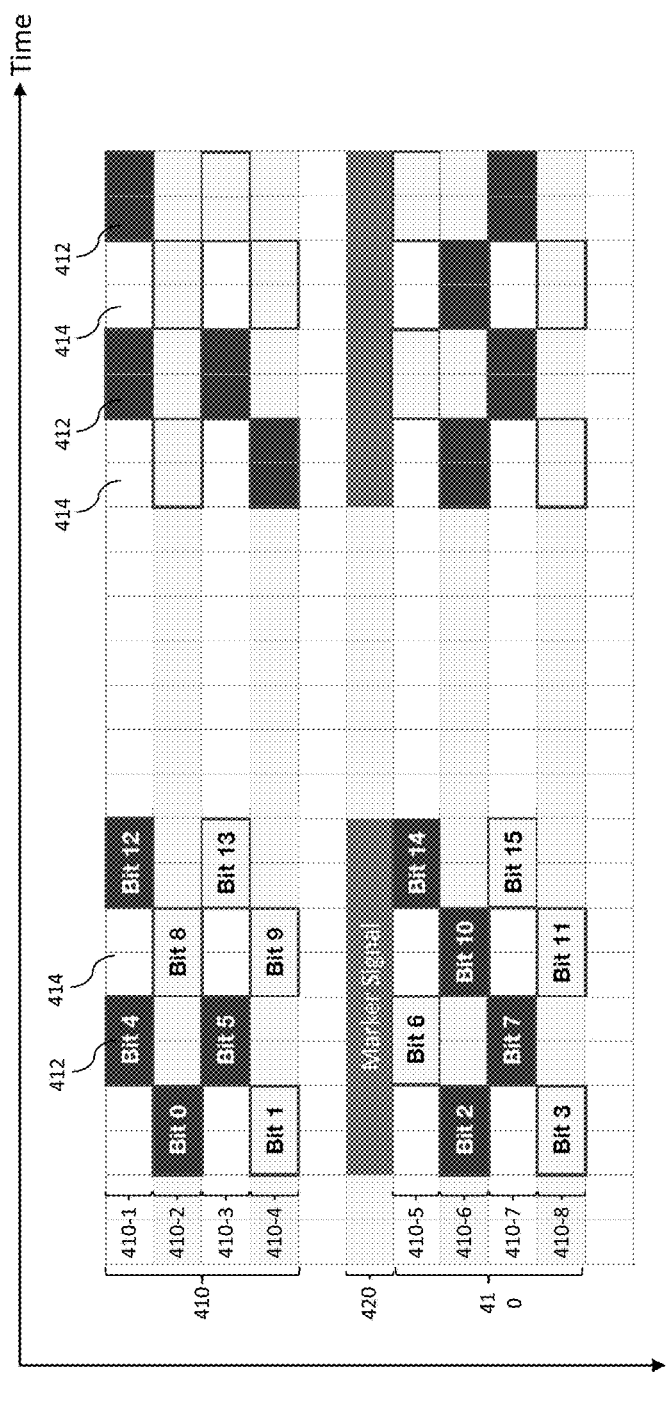

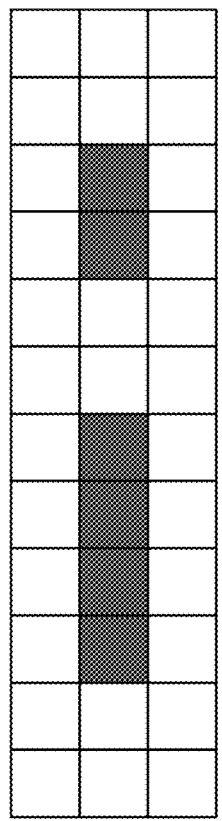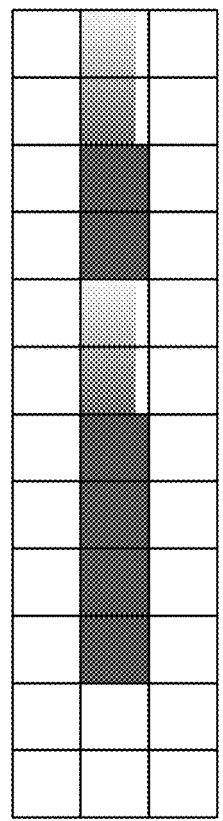

SYNCHRONISATION OF AUDIO AND VIDEO PLAYBACK

CLAIM OF PRIORITY

This patent application claims priority from GB patent application number 1408188.9, filed on 8 May 2014, the full contents of which are incorporated herein by reference.

TECHNICAL FIELD

The present invention relates to the field of audio-visual presentation systems and, in particular, to the synchronisation of the playback by a portable device of audio content of an audio-visual presentation with video content of the audio-visual presentation being displayed to the user of the portable device on a remote screen.

BACKGROUND

Conventional audio-visual presentation systems, such as cinemas and home entertainment systems, typically display video content of an audio-visual presentation (e.g. a film, a TV show or a commercial, for example) to a viewer on a screen (e.g. a cinema or TV screen), and play audio content of the audio-visual presentation (e.g. a film soundtrack) to the viewer through a speaker system. The problem of synchronising playback of the audio and video content of an audio-visual presentation in the form of a film (or "motion picture") was solved in the early part of the 20$^{th}$ century by placing a soundtrack encoding the audio physically onto the tape of the film reel, next to the frames of the film, in order to ensure that the right moment of audio accompanies the right moment in the video when the reel is played. Despite the many technological advances that have occurred since that time, the concept underlying this approach to synchronising picture and sound has remained widely in use.

Recently, there has been great interest in developing audio-visual presentation systems that allow each viewer of a film or other kind of audio-visual presentation to enjoy a personalised auditory experience, by listening to one of a number of alternative soundtracks via headphones or earphones, for example. The soundtrack may be selected by each viewer in accordance with their individual needs or preferences. For example, each viewer might wish to listen to one of a number of alternative language versions of a film, descriptive audio for the visually impaired, or a director's commentary. Such delivery of audio content to viewers also opens up the possibility of using binaural audio presentation to immerse each viewer in a realistic 3D sound environment that is difficult to replicate using even the most advanced surround sound speaker systems available today.

However, known approaches to delivering personalised audio content to viewers have significant drawbacks that have hindered their uptake. For example, in the case of delivering personalised audio content to viewers in a cinema via headphones that plug into headphone jacks provided in cinema seats, a significant investment in the required infrastructure and its maintenance must be made by the cinema. An alternative approach which has been proposed, namely of streaming the audio content (for example, via a WiFi™ network or a Bluetooth™ connection provided by the cinema) to a portable device, such as the cinema-goer's smartphone or PDA, so that the cinema-goer can listen to the film's audio content via headphones or earphones connected to his/her portable device, is also costly as the cinema would need to provide an appropriate means of reliably distributing the audio content throughout the cinema auditorium during shows.

SUMMARY

In view of the drawbacks of the prior systems identified above, the present inventors have devised an audio-visual presentation system which can allow a viewer of video content of an audio-visual presentation to listen to associated audio content stored on their portable device that is played in synchronisation with the displayed video content, without the need for wired or wireless network infrastructure of the kinds mentioned above. The techniques of synchronising playback of stored audio content with displayed video content described herein rely instead on the transmission of timecodes in the form of acoustic signals that can easily be generated by many existing cinema and home entertainment sound systems, and which may be received by many smartphones and other kinds of portable device that are in widespread use today. Moreover, these techniques employ timecodes each encoded as a burst of one or more modulated acoustic signals that are pitched above the normal limits of human hearing (hereafter referred to as "ultrasonic synchronisation signals" or "ultrasonic timecodes"), which are used to synchronise playback of a stored audio content with the displayed video content without interfering with the delivery of the audio to the viewers' ears, thus allowing many users of the audio-visual presentation system to enjoy high quality playback of their respective audio at once.

The timecode is a number that may, for example, provide a direct or indirect indication of a time that would elapse during playback of the audio (or video) content from the beginning of the audio content (or video content, as the case may be) to a point in the content associated with the timecode, or a direct or indirect indication of a time that would have yet to elapse during playback of the audio (or video) content from a point in the content associated with the timecode to the end of the audio content (or video content, as the case may be). In other words, a timecode is a numerical representation of a unique point in the audio/video content. For example, a timecode of zero may represent the beginning of the content, while a timecode of 100.0 may represent a point in the content that is 100 seconds in. In all these cases, a unique location in the audio and/or video content of the audio-visual presentation for synchronising playback of the audio content with the display of the video content is indicated by the respective timecode or may be inferred from the respective timecode, as will be explained in the following.

When developing the synchronisation techniques described herein, the present inventors have found that the rate at which bits of a timecode may be encoded by modulation of an ultrasonic carrier signal so as to allow reliable decoding by the portable device is limited by the high-frequency response of the speaker or other device used to generate the ultrasonic synchronisation signal, as well as environmental effects such as echoing. This imposes a limit on how frequently ultrasonic synchronisation signals can be transmitted to the portable device and, consequently, how quickly synchronisation of the audio and video content of an audio-visual presentation can occur. To allow the audio-visual presentation system to reliably achieve rapid synchronisation of audio and video content playback, the inventors have devised a scheme of signalling the transmission of ultrasonic timecodes to the portable device in a way that avoids the need to dedicate any extra transmission time to the signalling, thereby allowing a higher timecode transmission rate and thus faster synchronisation to be achieved. In essence, the signalling scheme involves the transmission of ultrasonic synchronisation signals each comprising a timecode-carrying part that encodes a respective timecode through modulation of one or more ultrasonic carrier signals, and an ultrasonic marker signal at a different carrier frequency than the one or more ultrasonic carrier signals, where the timecode-carrying part and the ultrasonic marker signal of each ultrasonic synchronisation signal are transmitted conterminously.

More particularly, the present invention provides an audio-visual presentation system for presenting audio content of an audio-visual presentation in synchronisation with video content of the audio-visual presentation to a viewer of the video content. The audio-visual presentation system comprises an ultrasonic synchronisation signal generator arranged to generate a sequence of ultrasonic synchronisation signals during display of the video content. Each ultrasonic synchronisation signal comprises a timecode-carrying part that encodes a respective timecode through modulation of one or more ultrasonic carrier signals, and an ultrasonic marker signal at a different carrier frequency than the one or more ultrasonic carrier signals, wherein the ultrasonic synchronisation signal generator is arranged to transmit the timecode-carrying part and the ultrasonic marker signal of each ultrasonic synchronisation signal conterminously. The audio-visual presentation system further comprises a portable device for playing the audio content of the audio-visual presentation to the viewer, the portable device comprising: a storage device for storing the audio content; a microphone module operable to receive and digitise an ultrasonic signal comprising at least one of the ultrasonic synchronisation signals; a search module arranged to identify a timecode-carrying part of a digitised ultrasonic synchronisation signal in the digitised ultrasonic signal based on a received ultrasonic marker signal; a decoding module arranged to decode the identified timecode-carrying part to determine the corresponding timecode; and a playback module arranged to determine a playback point in the stored audio content based on the determined timecode and play the stored audio content to the viewer from the determined playback point such that the audio content is played in synchronisation with the displayed video content.

It will be appreciated from this brief overview that an audio-visual presentation system according to an embodiment may be provided in a cinema, for example; in this case, a cinema-goer may download their film soundtrack of choice onto their smart-phone (or other portable device) in the comfort of their own home, and then listen to the film soundtrack using their earphones or headphones while watching the film in the cinema, with the playback of the film soundtrack being synchronised quickly and effectively with the picture on the cinema screen by using the cinema's existing audio equipment (including amplifiers, loudspeakers etc.) to broadcast a sequence of ultrasonic synchronisation signals. As will become apparent from the following description, the synchronisation techniques described herein can ensure reliable synchronisation at any point during the film presentation and thus cater for, e.g. late-comers and viewers returning to the auditorium part way through the film presentation with refreshments, as well as interruptions to the film presentation.

Besides achieving fast audio and video synchronisation as explained above, the particular form of the ultrasonic synchronisation signal generated by the ultrasonic synchronisation signal generator may provide other significant advantages. For example, the marker signal may not only be used to demarcate the timecode-carrying part of the synchronisation signal but also to optimise the process by which the decoding module decodes the timecode-carrying part of the synchronisation signal, thereby making it more likely to correctly decode a received synchronisation signal.

For example, in one embodiment, where the ultrasonic synchronisation signal generator is arranged to generate a periodic sequence of ultrasonic synchronisation signals, the ultrasonic marker signal in each of the ultrasonic synchronisation signals takes the form of a marker pulse whose leading edge coincides with one end of the timecode-carrying part of the synchronisation signal, and whose trailing edge coincides with the other end of the timecode-carrying part of the synchronisation signal. In this embodiment, the decoding module is arranged to decode the identified timecode-carrying part of the digitised ultrasonic synchronisation signal by using the marker pulse of the digitised ultrasonic synchronisation signal to determine a threshold level for performing a binarising process, said binarising process being based on the identified timecode-carrying part, and performing the binarising process using the determined threshold level to determine the corresponding timecode. As the marker pulse is transmitted and received conterminously with the timecode-carrying part of the ultrasonic synchronisation signal, its amplitude provides a good indication of how the signal in the timecode-carrying part has been affected by attenuation and noise during transmission (which may vary on the timescale of the synchronisation signal transmission period), so that the threshold level for the binarising process can be set appropriately.

The decoding module may determine the threshold level in one of a number of different ways. For example, in one embodiment, the decoding module is arranged to calculate a respective duty cycle of the marker pulses (i.e. the proportion of a repeat period of the marker pulse that is taken up by the "high" part of the marker pulse) in the periodic sequence of ultrasonic synchronisation signals for each of a plurality of candidate values of the threshold level, and select the threshold level for the binarising process from among the candidate values of the threshold level such that the selected threshold level yields a duty cycle lying within a predetermined range of values of the duty cycle. For example, the selected threshold level may be such that it yields a calculated duty cycle that is within the range of 40 to 60 percent, if the marker pulse is known to be transmitted with a 50 percent duty cycle.

In embodiments where the ultrasonic synchronisation signal generator is arranged to transmit the timecode-carrying part of each ultrasonic synchronisation signal at a plurality of ultrasonic frequencies, the marker pulse of each ultrasonic synchronisation signal may be transmitted at another ultrasonic frequency that is in a central portion of an ultrasonic frequency band comprising said plurality of ultrasonic frequencies. Such transmission of the marker pulse in substantially the middle of the aforementioned ultrasonic frequency band allows its amplitude to provide a good indication of how the signals in the timecode-carrying part at the various different ultrasonic frequencies have been affected by attenuation and noise during transmission, so that an appropriate threshold level for the binarising process can be set appropriately.

The present invention further provides an ultrasonic synchronisation signal generator for use in an audio-visual presentation system comprising a display device for displaying video content of an audio-visual presentation, and a portable device for playing audio content of the audio-visual presentation to a viewer of the video content. The ultrasonic synchronisation signal generator stores an ultrasonic synchronisation signal soundtrack which, when played by the ultrasonic synchronisation signal generator, comprises a sequence of ultrasonic synchronisation signals for synchronising playback of the audio content by the portable device with the displayed video content. Each ultrasonic synchronisation signal comprises a timecode-carrying part that encodes a respective timecode through modulation of one or more ultrasonic carrier signals, and an ultrasonic marker signal at a different carrier frequency than the one or more ultrasonic carrier signals, wherein the ultrasonic synchronisation signal generator is arranged to transmit the timecode-carrying part and the ultrasonic marker signal of each ultrasonic synchronisation signal conterminously.

The present invention further provides a portable device for playing audio content of an audio-visual presentation to a viewer of video content of the audio-visual presentation, wherein the portable device is arranged to synchronise playback of the audio content with the displayed video content based on at least one received ultrasonic synchronisation signal. The portable device comprises a storage device for storing the audio content of the audio-visual presentation, and a microphone module operable to receive and digitise an ultrasonic signal comprising the at least one ultrasonic synchronisation signal, the at least one ultrasonic synchronisation signal comprising: a timecode-carrying part that encodes a respective timecode through modulation of one or more ultrasonic carrier signals; and an ultrasonic marker signal at a different carrier frequency than the one or more ultrasonic carrier signals, the ultrasonic marker signal being conterminous with the timecode-carrying part. The portable device further comprises a search module arranged to identify the timecode-carrying part of a digitised ultrasonic synchronisation signal in the digitised ultrasonic signal based on a received ultrasonic marker signal, and a decoding module arranged to decode the identified timecode-carrying part to determine the corresponding timecode. The portable device also includes a playback module arranged to determine a playback point in the stored audio content based on the determined timecode and play the stored audio content to the viewer from the determined playback point such that the audio content is played in synchronisation with the video content.

The present invention further provides a method of playing audio content of an audio-visual presentation to a viewer of video content of the audio-visual presentation in synchronisation with the video content, wherein playback of the audio content is synchronised with the displayed video content based on at least one ultrasonic synchronisation signal received during display of the video content. The method comprises receiving and digitising an ultrasonic signal comprising the at least one ultrasonic synchronisation signal, the at least one ultrasonic synchronisation signal comprising: a timecode-carrying part that encodes a respective timecode through modulation of one or more ultrasonic carrier signals; and an ultrasonic marker signal at a different carrier frequency than the one or more ultrasonic carrier signals, the ultrasonic marker signal being conterminous with the timecode-carrying part. The method further comprises: identifying the timecode-carrying part of a digitised ultrasonic synchronisation signal in the digitised ultrasonic signal based on a received ultrasonic marker signal; decoding the identified timecode-carrying part to determine the corresponding timecode; determining a playback point in a stored audio content based on the determined timecode; and playing the stored audio content from the determined playback point such that the audio content is played in synchronisation with the video content.

The present invention further provides a non-transitory storage medium storing computer program instructions. When executed by a processor of a processing device, the computer program instructions cause the processing device to play audio in synchronisation with video that is displayed by a separate device. The computer program instructions cause the processing device to play the audio by: digitising a received ultrasonic signal comprising at least one ultrasonic synchronisation signal, the at least one ultrasonic synchronisation signal comprising a timecode-carrying part that encodes a respective timecode through modulation of one or more ultrasonic carrier signals; and an ultrasonic marker signal at a different carrier frequency than the one or more ultrasonic carrier signals, the ultrasonic marker signal being conterminous with the timecode-carrying part; identifying the timecode-carrying part of a digitised ultrasonic synchronisation signal in the digitised ultrasonic signal based on a received ultrasonic marker signal; decoding the identified timecode-carrying part to determine the corresponding timecode; determining a playback point in stored audio based on the determined timecode; and playing the stored audio from the determined playback point such that the audio is played in synchronisation with the video.

The present invention further provides a non-transitory storage medium storing an ultrasonic synchronisation signal soundtrack for synchronising playback of audio content of an audio-visual presentation to a viewer of video content of the audio-visual presentation. The ultrasonic synchronisation signal soundtrack, when played, comprises a sequence of ultrasonic synchronisation signals, wherein each ultrasonic synchronisation signal comprises: a timecode-carrying part that encodes a respective timecode through modulation of one or more ultrasonic carrier signals; and an ultrasonic marker signal at a different carrier frequency than the one or more ultrasonic carrier signals, the ultrasonic marker signal being conterminous with the timecode-carrying part.

BRIEF DESCRIPTION OF THE DRAWINGS

Embodiments of the invention will now be explained in detail, by way of example only, with reference to the accompanying figures, in which:

FIGS. 2A and 2B schematically illustrate the encoding scheme in accordance with which timecodes are encoded onto a plurality of ultrasonic carrier signals in the embodiment;

FIG. 3A schematically illustrates data segments as they are intended to be received by the portable device 300 shown in FIG. 1, while FIG. 3B schematically illustrates data segments as actually received by the portable device 300;

DETAILED DESCRIPTION OF EMBODIMENTS

Figure 1:
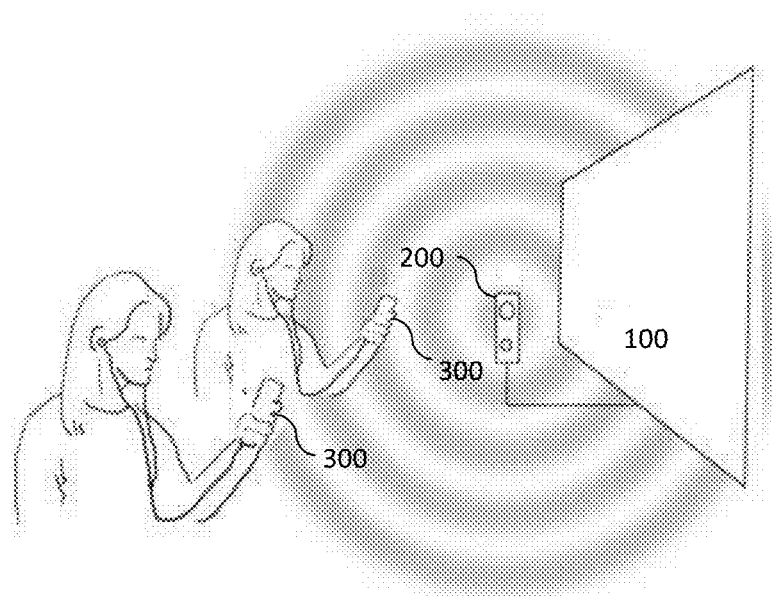
FIG. 1 shows components of an audio-visual presentation system according to an embodiment of the present invention.

FIG. 1 illustrates an audio-visual presentation system according to an embodiment of the present invention. By way of example, the audio-visual presentation system of the present embodiment is provided in a cinema, and serves to present to a cinema-goer audio content of a film being watched by the cinema-goer in synchronisation with the film picture being projected onto the cinema screen. However, it will be appreciated that the techniques described herein are applicable to other kinds of audio-visual presentation system, for example in home entertainment, where they may be used to make the viewing of television programs or films on a television set more enjoyable for the viewers. As another example, these techniques may also be applied to audio-visual presentation systems in educational environments, for example in museums, classrooms and lecture theatres, as well as those used in trade shows and other commercial settings.

As shown in FIG. 1, the audio-visual presentation system may, as in the present embodiment, include a display device 100 in the exemplary form of a cinema screen, onto which the picture of the film is projected by the cinema's projection system (not shown). In the present embodiment, the various loudspeakers and their associated signal sources, amplifiers etc. constituting the cinema's sound system are configured to function as an ultrasonic synchronisation signal generator 200, which generates synchronisation signals only at ultrasonic frequencies. The synchronisation signals comprise a sequence of ultrasonic synchronisation signals that are emitted by the cinema's sound system during the presentation of the film. These ultrasonic synchronisation signals are received by a portable device 300 being used by the cinema-goer, such as his/her smart-phone, which stores the audio content of the film and plays back the stored audio content via, e.g. headphones or earphones plugged into the smart-phone. Moreover, the portable device 300 is configured to process one or more of the received ultrasonic synchronisation signals so as to synchronise playback of the audio content with the picture being displayed on the display device 100, as will be explained in the following. Accordingly, the audio-visual presentation system of the present embodiment may be regarded as a "silent cinema", in the sense that the cinema's sound system itself produces no sounds during the film presentation that are audible to the human ear. The sound system may, however, be used for public announcements relating to advertising etc. before the film presentation, and/or for safety or security announcements during an interruption to the film presentation. However, in other embodiments, the ultrasonic synchronisation signal generator 200 may generate audible sounds (e.g. play background music) while it is emitting the ultrasonic synchronisation signals.

The cinema's pre-existing sound system is thus arranged to play an "ultrasonic synchronisation signal soundtrack" comprising a sequence of ultrasonic synchronisation signals during display of the video content of the film on the cinema screen, such that each of the ultrasonic synchronisation signals is an encoded representation of the timecode for a corresponding point in the film presentation. The sound system 200 may, as in the present embodiment, be arranged to generate the ultrasonic synchronisation signals periodically, such that the ultrasonic synchronisation signals in the sequence are emitted at regular time intervals (e.g. once every second) throughout the duration of the film. Thus, instead of the usual film soundtrack, the cinema's sound system 200 is configured to play the ultrasonic synchronisation signal soundtrack to the audience.

As an example, for an hour-long film, the ultrasonic synchronisation signal soundtrack may contain instructions for causing the cinema's sound system 200 to generate one ultrasonic synchronisation signal every second, so that 3600 different ultrasonic synchronisation signals are emitted during the course of the film presentation, where each generated synchronisation signal is a burst of ultrasonic pulses encoding a respective timecode value that represents the number of seconds that have elapsed since the start of the film presentation. The ultrasonic synchronisation signal soundtrack may be attached to any motion picture asset. For modern digital content, this alternative soundtrack may be interleaved with the picture data. For traditional film, the ultrasonic synchronisation signal soundtrack may replace an existing soundtrack. As those skilled in the art will be familiar with various techniques that may be used to produce such an ultrasonic synchronisation signal soundtrack, a description of these techniques will not be provided here. The ultrasonic synchronisation signal soundtrack may, as in the present embodiment, be stored in a storage medium for distribution to the cinema or other venue hosting the audio-visual presentation. By way of example, the storage medium may be a Blu-ray™ disc or a DVD disc. Preferably, the storage medium also stores the video content of the audio-visual presentation. The ultrasonic synchronisation signal soundtrack may alternatively be encoded in a signal that may be transmitted over a computer network (e.g. downloaded over the Internet) to the cinema or other venue and played through the venue's sound system while the video content is being displayed.

Further details of the structure of the ultrasonic synchronisation signals that are generated by the cinema's sound system 200 will now be described with reference to FIGS. 2A and 2B.

FIG. 2A is a schematic illustration of two consecutive ultrasonic synchronisation signals in the sequence of ultrasonic synchronisation signals that is generated by the ultrasonic synchronisation signal generator 200. In general, each ultrasonic synchronisation signal 400 comprises a timecode-carrying part that encodes a respective timecode through modulation of at least one ultrasonic carrier signal, as well as an ultrasonic marker signal at a different carrier frequency than the at least one ultrasonic carrier signal, wherein the timecode-carrying part and the marker signal are transmitted conterminously by the ultrasonic synchronisation signal generator 200.

Although each timecode-carrying part may thus encode a respective timecode through modulation (e.g. amplitude modulation or phase modulation) of a single ultrasonic carrier signal, the timecode-carrying part of each ultrasonic synchronisation signal preferably encodes a respective timecode through modulation of a plurality of ultrasonic carrier signals (or "channels") having different frequencies, preferably in the range of 18 kHz to 22 kHz. In the present embodiment, the timecode-carrying part 410 of each ultrasonic synchronisation signal 400 encodes a respective timecode through amplitude modulation of eight ultrasonic carrier signals, 410-1 to 410-8, as shown in FIG. 2A, which are transmitted simultaneously by the sound system 200. The frequencies of the carrier signals are preferably selected to have sufficient separation to allow the individual carrier signals to be clearly resolved by the portable device 300.

More specifically, the ultrasonic synchronisation signal generator 200 is arranged to generate the timecode-carrying part 410 of the ultrasonic synchronisation signal 400 by amplitude-modulating each of the ultrasonic carrier signals 410-1 to 410-8 so as to encode a logical "1" or a logical "0" in each of a plurality of data-carrying segments 412, and transmitting the data-carrying segments such that each of the data carrying segments 412 is followed by a non-data-carrying segment 414. The shaded labelled segments shown in FIG. 2A are data-carrying segments representing a bit value of "1", while the unshaded (white) labelled segments are data-carrying segments representing a bit value of "0". In each non-data-carrying segment 414, the ultrasonic carrier signal has an amplitude which does not exceed a predetermined threshold. More particularly, the ultrasonic synchronisation signal generator 200 is configured to modulate the ultrasonic carrier signal to have an amplitude in each non-data-carrying segment 414 that is below the predetermined threshold value, which may be set such that the non-data-carrying segment 414 does not affect the decoding of the following data-carrying segment by the portable device 300, as will be explained in the following. The ultrasonic synchronisation signal generator 200 may thus modulate the carrier signal by appropriately attenuating the amplitude of a generated carrier signal, or by stopping the generation of the carrier signal for the duration of the non-data-carrying segment, for example. For example, the non-data-carrying segments 414 may be amplitude-modulated in the same way as a logical "0" in the data-carrying segments 412. As shown in FIG. 2A, the data-carrying segments 412 of each modulated ultrasonic carrier signal are transmitted conterminously with the non-data-carrying segments 414 of each adjacent ultrasonic carrier signal. In this way, the frequency channels used to carry the timecode bits alternate between two sets of frequency channels (i.e. a first set comprising channels 410-2, 410-4, 410-6 and 410-8, and a second set comprising channels 410-1, 410-3, 410-5 and 410-7 in the present embodiment) after the transmission of each set of conterminous data-carrying segments 412 (e.g. Bits 0-3, Bits 4-7, Bits 8-11, or Bits 12-15 shown in FIG. 2A), thereby allowing any echoes etc. to be received by the portable device 300 during the conterminous non-data-carrying segments 414 that immediately follow each set of conterminous data-carrying segments 412. As will be explained in the following, the portable device 300 is configured to ignore the content of the non-data-carrying segments 414 but to extract the timecode value from the data-carrying segments 412.

Each data-carrying part 410 of the ultrasonic synchronisation signal 400 shown in FIG. 2A provides a binary representation of the corresponding timecode value, where the amplitude of a carrier signal at a given frequency represents a logical "1" or a logical "0". More specifically, 14 bits are used in the present embodiment to represent the timecode value, and two bits are used to provide parity information for use in a validity check, which is described below. Using 14 bits allows for 16384 unique timecode values. If one ultrasonic synchronisation signal is transmitted every second by the sound system 200, this would be sufficient for a presentation 273 minutes in length (or over 4.5 hours). As shown in FIG. 2B, the timecode-carrying part 410 of the ultrasonic synchronisation signal 400 shown in FIG. 2A indicates a timecode value of 5301 and thus a point in the stored soundtrack that is to accompany the picture displayed on the cinema screen 5301 seconds (i.e. 1 hour, 28 minutes and 21 seconds) from the beginning of the presentation (in the example of FIG. 2B, "Bit 13" is the most significant bit while "Bit 0" is the least significant bit, and "Bit 14" and "Bit 15" are parity bits set aside for the validity check).

Advantages that follow from interleaving non-data-carrying segments 414 with the data-carrying segments 412 will now be explained with reference to FIGS. 3A and 3B.

FIG. 3A is a schematic illustration of four adjacent data-carrying segments in a single frequency channel, which are intended to encode bits values of "1", "1", "0" and "1". However, the inventors have found that, owing to various effects including the reflection of pulses emitted by the sound system 200 off walls and other objects in the cinema auditorium, the ultrasonic pulses which actually reach the portable device 300 tend not to end abruptly, as intended, but often decay on a time scale comparable to the duration of a data-carrying segment 412. This may lead to an intended bit value of "0" being incorrectly interpreted as a value of "1" by the portable device 300, which can significantly increase the error rate.

The inventors have addressed this problem by: (i) interleaving the data-carrying segments 412 with non-data-carrying segments 414 carrying no data, which are provided to allow any residual sound amplitude to decay to a level that is unlikely to result in a following encoding of a bit value of "0" being incorrectly decoded as a "1" by the portable device 300; and (ii) offsetting the data-carrying segments 412 of adjacent modulated ultrasonic carrier signals relative to each other such that the data-carrying segments 412 of each modulated ultrasonic carrier signal are transmitted conterminously with the non-data-carrying segments 414 of adjacent modulated ultrasonic carrier signal(s). This arrangement allows the transmission of data segments and non-data-carrying segments to proceed in parallel in order to maintain a high data transmission rate, while ensuring that each data segment is transmitted conterminously with non-data-carrying segments in the adjacent frequency channel(s), thereby reducing the risk of cross-talk, with signals in one frequency channel being interfered with by the signals in adjacent frequency channel(s). This may also allow a narrower channel spacing to be used.

Referring again to FIG. 2A, the ultrasonic marker signal 420 may, as in the present embodiment, be provided in the form of a marker pulse whose leading edge coincides with one end of the timecode-carrying part 410, and whose trailing edge coincides with the other end of the timecode-carrying part 410 of the synchronisation signal 400. The presence of the ultrasonic marker pulse 420 allows the portable device 300 to determine a timeframe for the timecode-carrying part in a digitised record of the received ultrasonic signal that is stored in the portable device 300. The sound system 200 may, as in the present embodiment, be arranged to generate the marker pulses 420 so as to have a predetermined duty cycle, for example 50 percent. In this case, the marker pulse 420 as received by the portable device 300 is expected to be present for 0.5 seconds in each 1-second period. The signal processing operations performed by the portable device 300 can make use of this property of the marker pulse 420 to achieve more reliable decoding of received ultrasonic synchronisation signals, as will be described in the following.

The marker pulse 420 may, as in the present embodiment, be provided substantially in the middle (or within a central portion) of the frequency band that spans the range of frequencies of the ultrasonic carrier signals 410-1 to 410-8, in order to allow the portable device 300 to determine a value of a threshold level that is suitable for effectively decoding data-carrying segments received at all of the carrier frequencies in the frequency band, as will also be described in the following.

Functional components of the portable device 300 that are helpful for understanding the present invention will now be described with reference to FIG. 4.

Figure 4:
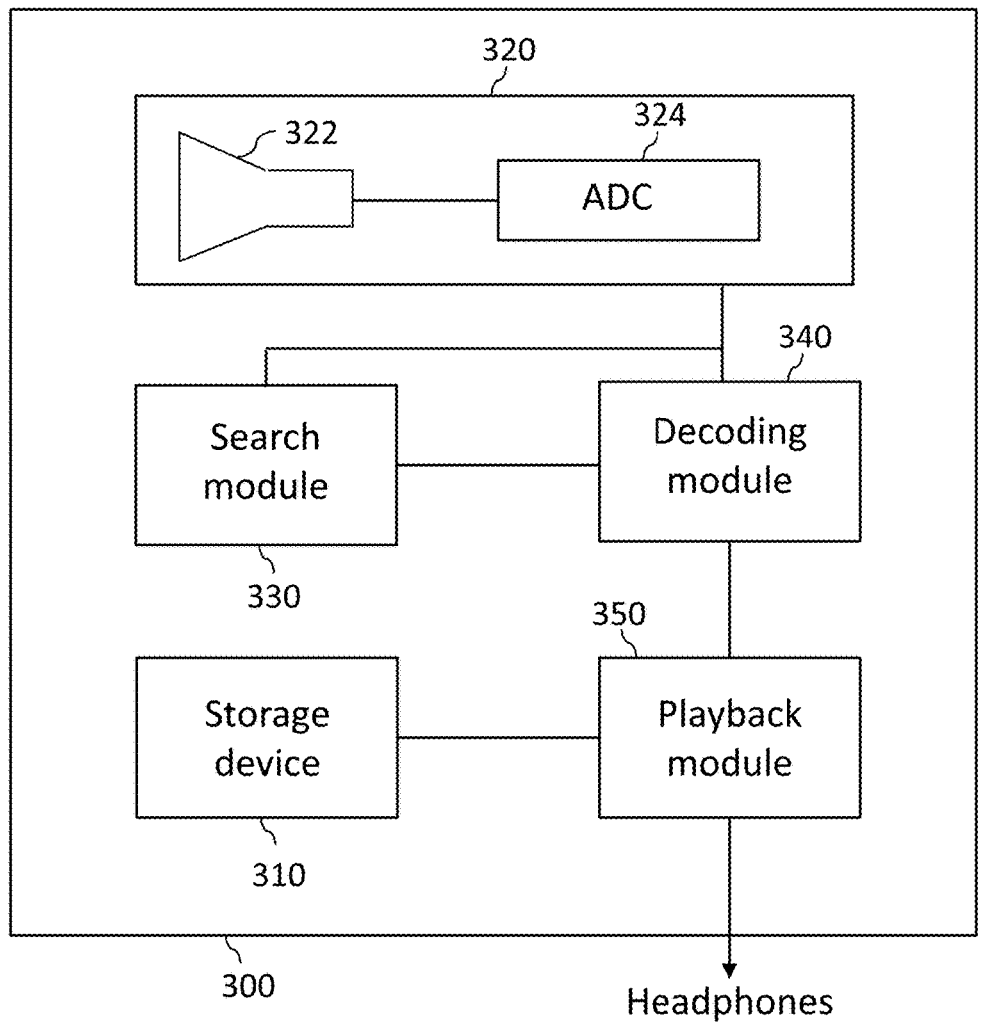
FIG. 4 schematically illustrates components of the portable device 300 shown in FIG. 1.

As illustrated in FIG. 4, the portable device 300 of the present embodiment comprises a storage device 310 for storing the audio content of the audio-visual presentation, a microphone module 320 having a microphone 322 and an analog-to-digital converter (ADC) 324 that are arranged to receive and digitise an ultrasonic signal comprising the ultrasonic synchronisation signals 400 generated by the cinema's sound system 200, and a search module 330 that is arranged to identify the timecode-carrying part of a digitised ultrasonic synchronisation signal in the digitised ultrasonic signal based on a received ultrasonic marker signal 420. The portable device 300 also includes a decoding module 340 arranged to decode the identified timecode-carrying part to determine the corresponding timecode, and a playback module 350, which is arranged to determine a playback point in the stored audio content based on the determined timecode and play the stored audio content to the cinema-goer from the determined playback point such that the audio content is played in synchronisation with the video content. In the present embodiment, the playback module 350 plays the audio content through headphones which plug into the portable device 300, although earphones or another kind of personal audio device may alternatively be used. The playback module 350 may alternatively play the audio content through speakers. The storage device 310, microphone module 320, search module 330, decoding module 340 and playback module 350 are functionally inter-connected to communicate with one another as shown in FIG. 4.

Figure 5:
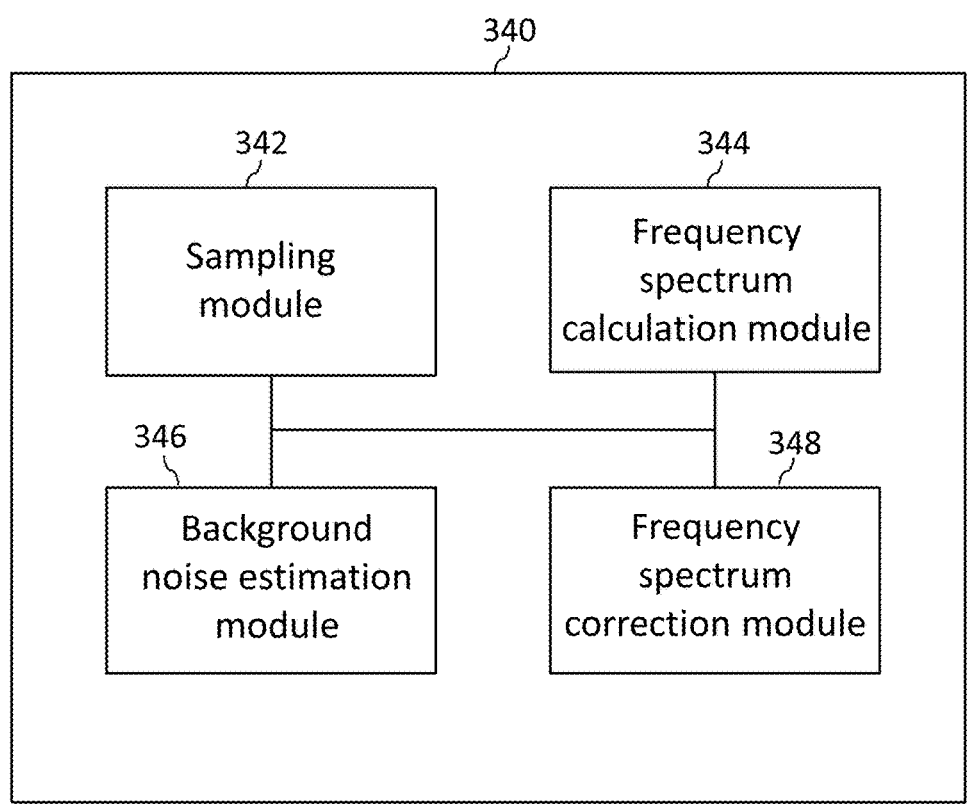
FIG. 5 schematically illustrates functional modules of the decoding module 340 shown in FIG. 4.

FIG. 5 provides a schematic illustration of component parts of the decoding module 340, namely a sampling module 342, a frequency spectrum calculation module 344, a background noise estimation module 346, and a frequency spectrum correction module 348. These components of the decoding module 340 are functionally inter-connected as shown in FIG. 5 to communicate with one another.

Figure 6:
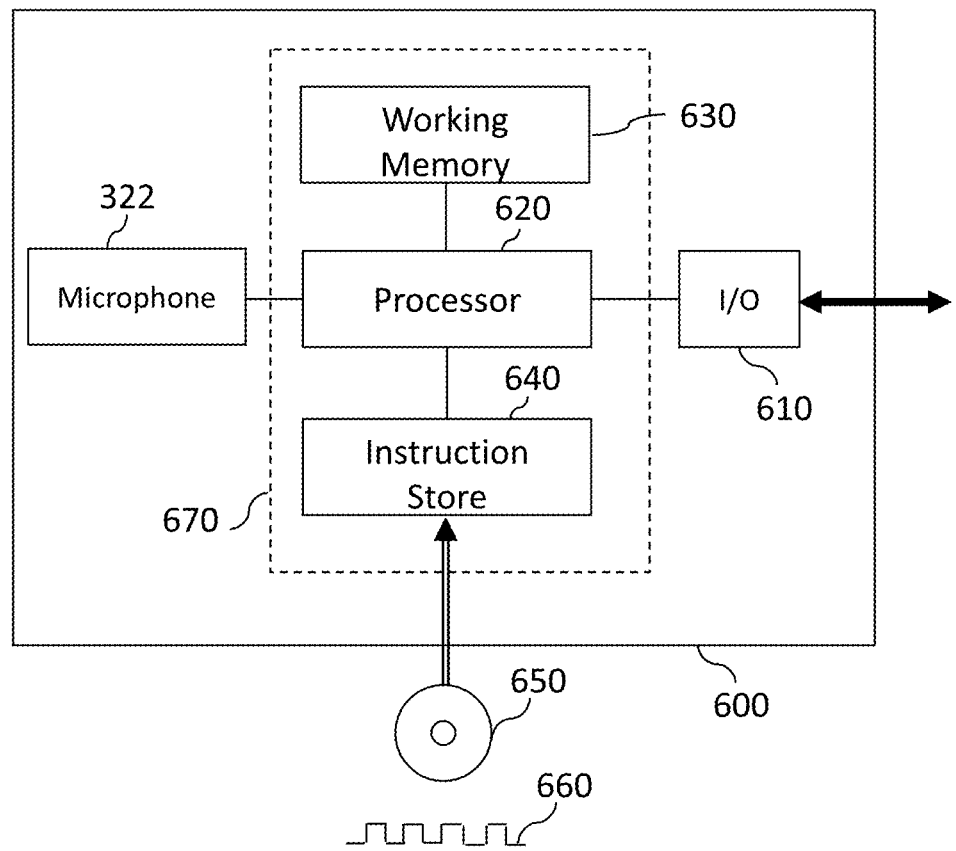
FIG. 6 shows an exemplary hardware implementation of portable device 300.

FIG. 6 shows an example of programmable signal processing hardware that may form part of the portable device 300 and implement the functions of the component modules illustrated in FIGS. 4 and 5. The signal processing apparatus 600 shown in FIG. 6 comprises an input/output (I/O) section 610 for receiving audio content of a film during download of a film soundtrack before the film presentation, and for outputting the audio content to headphones or earphones during the film presentation. In addition, the signal processing apparatus 600 includes a microphone 322 as also shown in FIG. 4. The signal processing apparatus 600 further comprises a processor 620, a working memory 630 and an instruction store 640 storing computer-readable instructions which, when executed by the processor 620, cause the processor 620 to perform the processing operations hereinafter described to synchronise playback of the stored audio content with displayed video content of the film. The instruction store 640 may comprise a ROM which is preloaded with the computer-readable instructions. Alternatively, the instruction store 640 may comprise a RAM or similar type of memory, and the computer readable instructions can be input thereto from a computer program product, such as a computer-readable storage medium 650 such as a CD-ROM, etc. or a computer-readable signal 660 carrying the computer-readable instructions.

The computer-readable instructions may, for example, take the form of a custom application ("app"), which the user can download to his/her smart-phone (e.g. from the online iTunes™ store where the smart-phone is an iPhone™, or from the Google Play™ store for smart-phones running an Android™ operating system) and use to select and download their film audio content of choice (including, for example, the spoken part, voice-overs, music and/or sound effects that is/are to accompany the video content of the film) to the portable device 300, and to synchronise playback of the audio content with displayed video content of the film during the film presentation at the cinema.

In the present embodiment, the combination 670 of the hardware components shown in FIG. 6, comprising the processor 620, the working memory 630 and the instruction store 640, is configured to implement the functionality of the aforementioned search module 330, decoding module 340 and playback module 350 shown in FIG. 4, as well as the sampling module 342, frequency spectrum calculation module 344, background noise estimation module 346 and frequency spectrum correction module 348 shown in FIG. 5, which will now be described in detail with reference to FIGS. 7 to 12.

Figure 7:
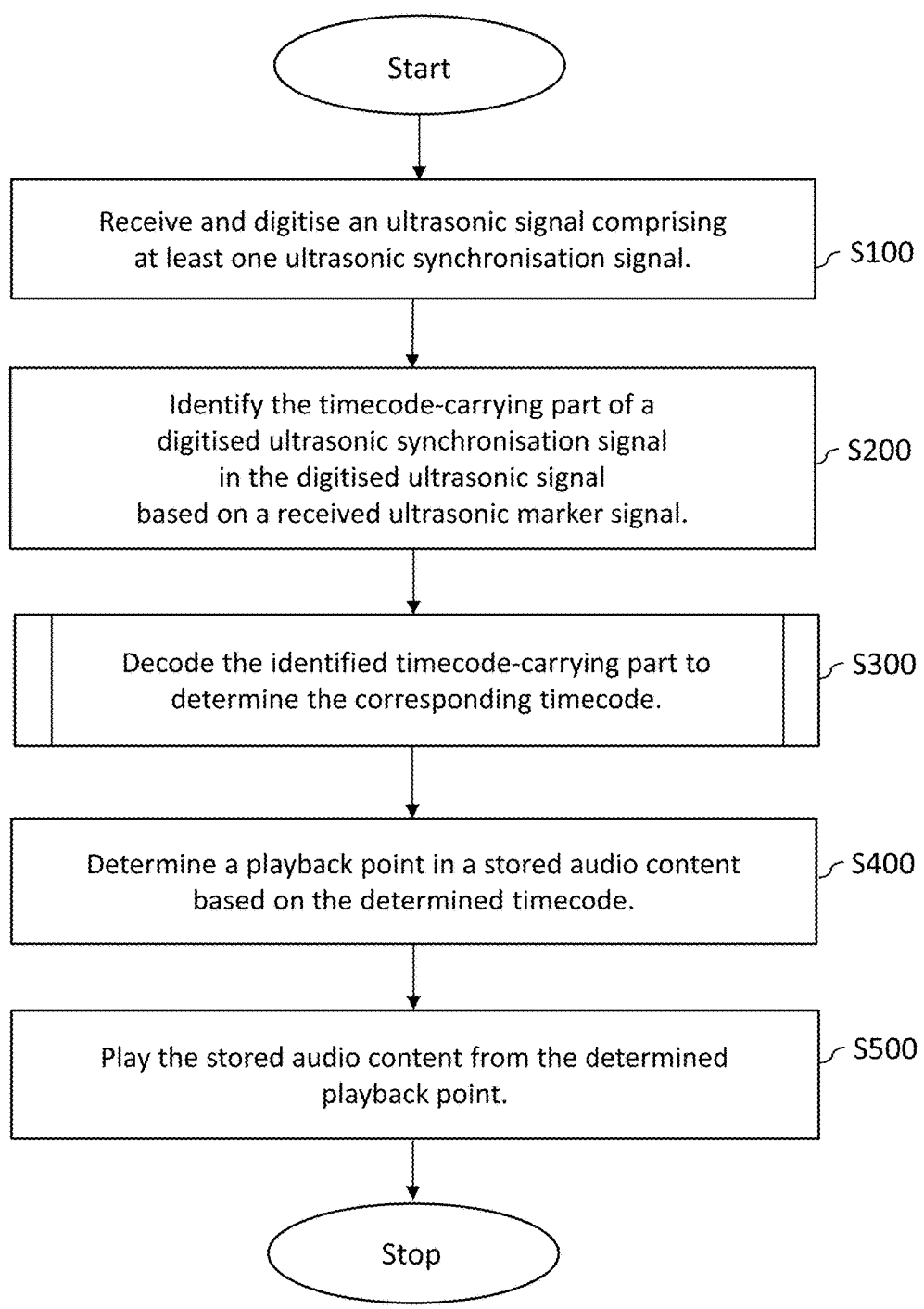
FIG. 7 is a flow diagram providing a top-level illustration of method of playing audio content that is performed by the portable device 300.
Figure 9:
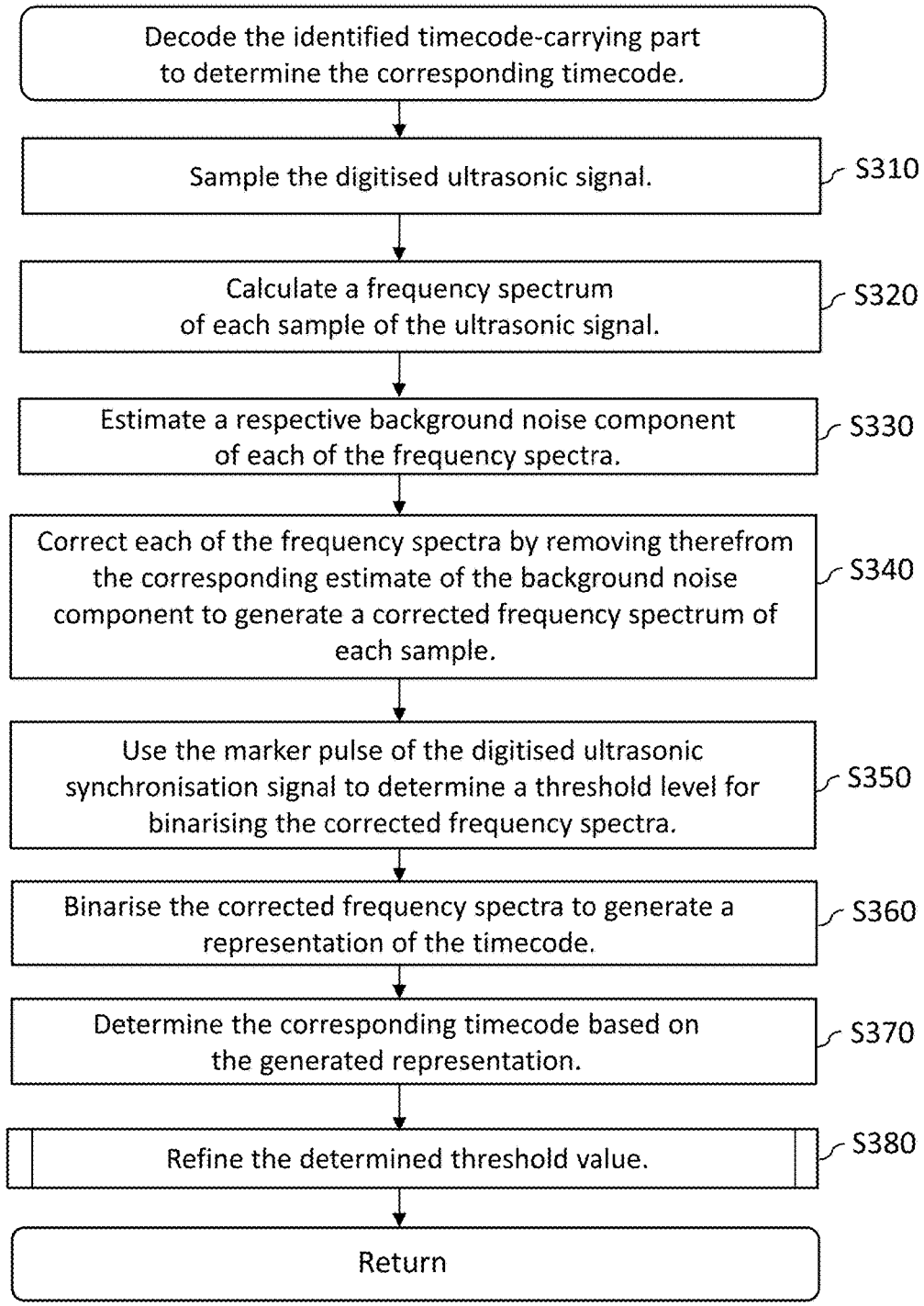
FIG. 9 is a flow diagram showing further details of the process performed in step S300 of FIG. 7.
Figure 12:
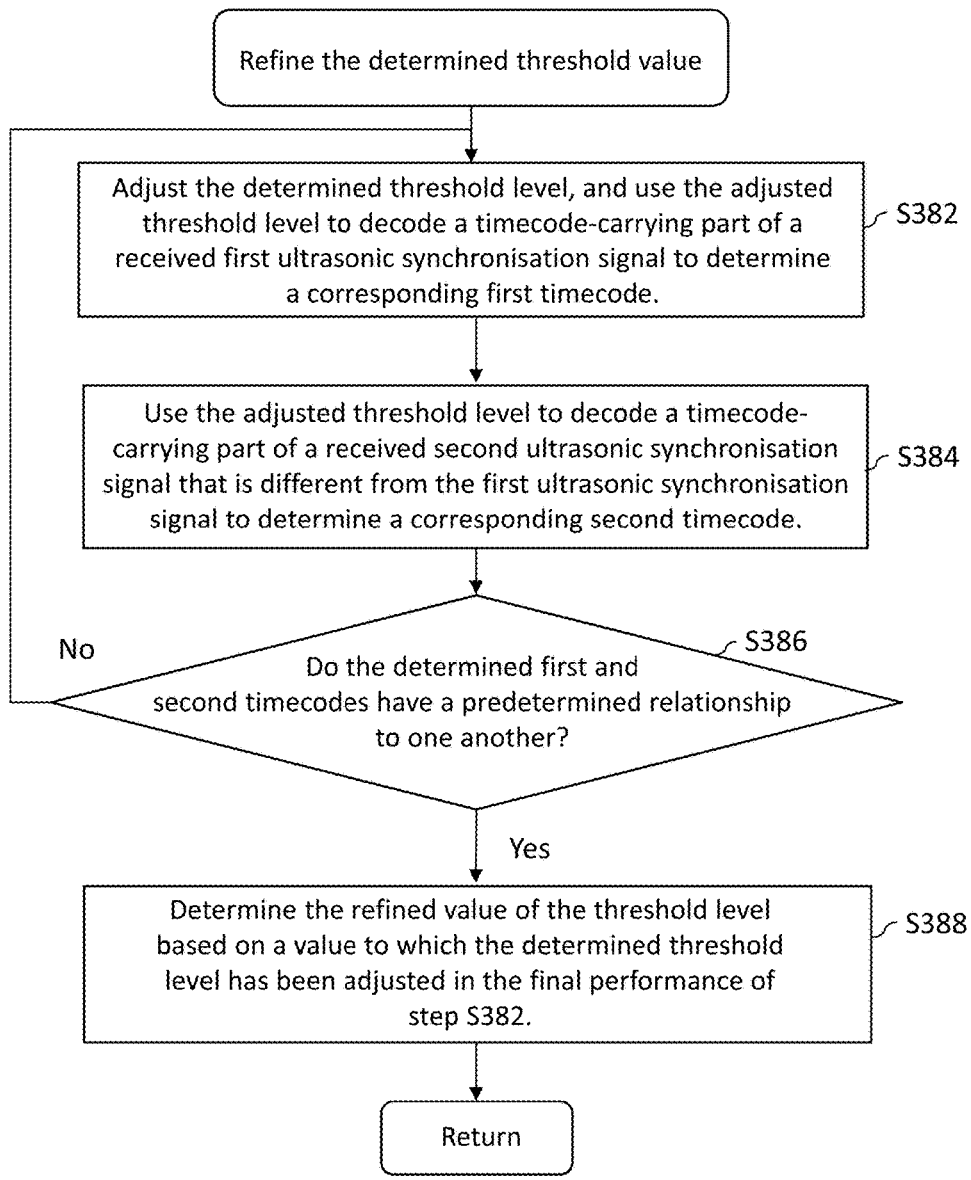
FIG. 12 is a flow diagram showing further details of the process performed in step S380 of FIG. 9.

FIGS. 7, 9 and 12 are flow charts illustrating a process by which the portable device 300 synchronises playback of the stored audio content with displayed video content of the film in the present embodiment.

FIG. 7 is a flow chart that provides a top-level illustration of the synchronisation process. In step S100 of FIG. 7, the microphone module 320 records a short amount of audio (typically a few seconds), which includes one or more of the ultrasonic synchronisation signals 400 generated by the ultrasonic synchronisation signal generator 200, as well as ambient noise. During this process, the microphone 322 converts the received sound waves to analog electrical signals, which are then digitised by the ADC 324 to produce a digitised record of the received audio. In step S100, the microphone module 320 preferably records at least two consecutive ultrasonic synchronisation signals, in order to establish the playback point with a high degree of reliability. For example, in the present embodiment, recording three seconds of audio will ensure that at least two ultrasonic synchronisation signals are captured. The ADC 324 is arranged to sample the signal from the microphone 322 at a rate of 48 kHz, and record each sample value as a 16-bit integer (i.e. using a bit depth of 16). Thus, 48000 16-bit integers will represent one second of recorded audio.

In step S200, the search module 330 identifies the timecode-carrying part of a digitised synchronisation signal in the digitised ultrasonic signal based on an ultrasonic marker signal in the received audio. More particularly, the search module 330 searches for the presence of a tone at the carrier frequency assigned to the marker pulse 420, and is able to determine a time frame in which the timecode-carrying part is located as the timecode-carrying part is conterminous with the marker pulse. The marker pulse thus allows the search module 330 to find the timecode-carrying part quickly, without having to resort to computationally intensive techniques such as those requiring pattern recognition to be performed in windowed portions of the digitised audio, for example.

In step S300, the decoding module 340 decodes the identified timecode-carrying part to determine the corresponding timecode. More particularly, the decoding module 340 uses the marker pulse of an ultrasonic synchronisation signal that has been captured and digitised to determine a threshold level for performing a binarising process (on the recorded data either in the time domain or in the frequency domain, if and when the data has been Fourier transformed), and performs the binarising process using the determined threshold level to determine the corresponding time code.

In step S400, the playback module 350 determines a playback point in the stored audio content based on the timecode determined in step S300. For example, the playback module 350 may, as in the present embodiment, convert the timecode value to a time that has elapsed from the start of the film, and determine the playback point using this value of the time (making any necessary allowances for the time required to process the received ultrasonic synchronisation signal and begin playback of the audio content). Additionally or alternatively, the playback module 350 may calculate a time offset value that allows the playback module 350 to determine the playback point any time after even a single timecode value has been determined, as will now be explained.

During playback of the audio content, the time elapsed from the beginning of the film presentation (herein referred to as the "movie time") is the real (clock) time minus a time offset, which corresponds to the clock time when playback was started. For example, Table 1 below illustrates the constant time offset between the clock time and the movie time at four different points during a film presentation, which begins at 9:00 pm.

TABLE 1

| Clock time | Movie time | Time offset |
| --- | --- | --- |
| 9:00 pm | 0:00:00 | 9:00 |
| 9:01 pm | 0:01:00 | 9:00 |
| 9:30 pm | 0:30:00 | 9:00 |
| 10:30 pm | 1:30:00 | 9:00 |

Figure 8:
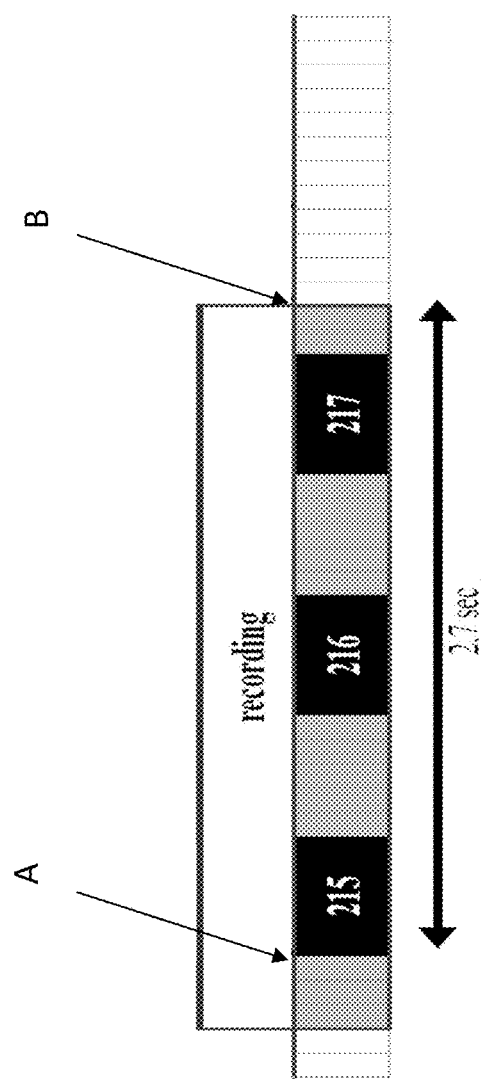
FIG. 8 is a schematic illustration of a digitised recording output by the microphone module 320 shown in FIG. 4.

FIG. 8 schematically illustrates a 3-second recording of audio generated by the microphone module 320, which contains three digitised ultrasonic synchronisation signals encoding timecode values of 215, 216 and 217. Once the timecode has been determined, the playback module 350 of the app will have the value of a timecode (t=215, as shown at A in the example of FIG. 8), the clock time when the recording by the microphone module 320 ended (as shown at point B, namely 8 h:32 m:16.3 s) and the interval in the recording from the timecode to the end of the recording (2.7 seconds). At the point labelled B in FIG. 8, both the clock time (8 h:32 m:16.3 s) and the movie time (217.7 s) are known, and the time offset can be calculated by subtracting one from the other. With this calculated value of the time offset, the clock time kept by the portable device 300 can be used at any point in the film presentation to determine the movie time and thus the playback point for playing the audio content in synchronisation with the video content displayed on the display device 100.

Referring again to FIG. 7, in step S500, the playback module 350 plays the stored audio content from the determined playback point to the cinema-goer via their headphones or earphones such that the audio content is played in synchronisation with the video content being displayed on the display device 100.

FIG. 9 is a flow chart illustrating an example of the processes performed in step S300 of FIG. 7.

In step S310, the sampling module 342 of the decoding module 340 takes a plurality of samples of the digitised recording of the received audio that includes the ultrasonic synchronisation signals. In the present embodiment, each sample obtained by the sampling module 342 is a block of 1024 digitised values of the recorded sound amplitude.

Figure 10:
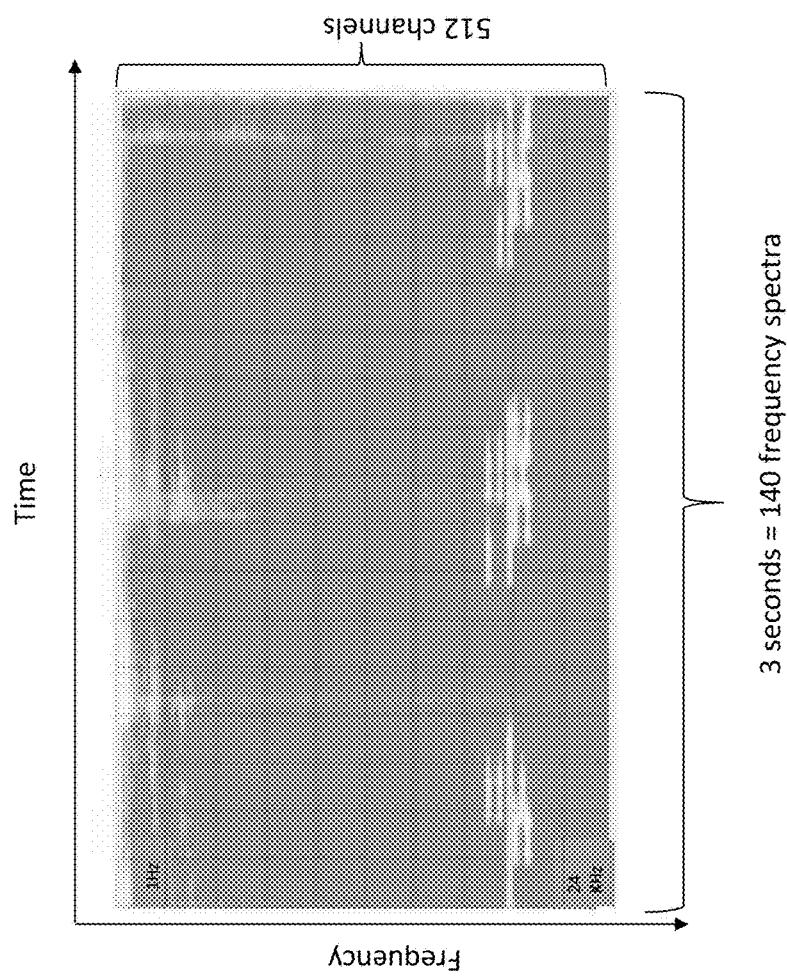
FIG. 10 presents results of processing operations that are performed by the decoding module 340 of FIG. 4 in the form of a spectrogram.

In step S320, the frequency spectrum calculation module 344 calculates a frequency spectrum for each of the blocks obtained in step S310, for example by performing a Fast Fourier Transform (FFT) on each block. The FFT of each block of 1024 16-bit values provides an indication of which frequencies were present in the portion of the received audio signal that corresponds to the block. As the 1024 values within each block correspond to 1024/48000=0.021 seconds of recorded audio, about 140 frequency spectra can be obtained from a 3-second recording. Each of these spectra has 512 discrete "containers" corresponding to individual frequencies. Furthermore, each of the containers will contain a value indicative of the contribution of that container to the spectral content in the block of digitised audio sample values. The 3-second recording can therefore be visualised as being 140 time units wide and having 512 frequency channels, as illustrated in FIG. 10. The decoding module 340 may perform a binarising process on this data to evaluate the timecode embedded therein, by binarising the frequency spectra of the samples of the ultrasonic signal corresponding to the timecode-carrying part of the digitised synchronisation signal to generate a representation of the corresponding timecode, and determining the corresponding timecode based on the generated representation thereof.

However, in order to reduce the adverse effects of background noise on the decoding process, the decoding module 340 may, as in the present embodiment, employ the background noise estimation module 346 in step S330 to estimate a respective background noise component of each of the plurality of frequency spectra, and the frequency spectrum correction module 348 to correct each of the frequency spectra in step S340 by removing therefrom the corresponding estimate of the background noise component to generate a corrected frequency spectrum of each sample. In this embodiment, the decoding module 340 performs the binarising process to determine the corresponding timecode by binarising the corrected frequency spectra of the samples of the ultrasonic signal corresponding to the timecode-carrying part of the ultrasonic synchronisation signal to generate a representation of the corresponding timecode, and by determining the corresponding timecode based on the generated representation thereof.

The background noise estimation module 346 may estimate a respective background noise component of each of the plurality of frequency spectra in one of a number of different ways. In the present embodiment, the background noise estimation module 346 takes advantage of the intervals in the recording between those that contain ultrasonic synchronisation signals to obtain estimates of the background noise that are not tainted by the modulation of the carrier signals 410-1 to 410-8. More specifically, the background noise estimation module 346 of the present embodiment estimates, for each frequency spectrum in the plurality of frequency spectra, a respective background noise component based on an amplitude of at least one spectral component (or "container") of a different frequency spectrum in the plurality of frequency spectra, the different frequency spectrum having been derived from a sample of the ultrasonic signal between two adjacent ultrasonic synchronisation signals in the sequence of ultrasonic synchronisation signals. This estimate may be calculated in any suitable or desirable way, for example by averaging a plurality of FFT amplitudes in the aforementioned frequency spectrum that lies between two adjacent ultrasonic synchronisation signals, or by estimating how the background noise varies as a function of frequency in the relevant ultrasonic frequency range.

In an alternative embodiment, the background noise estimation module 346 may estimate, for each frequency spectrum in the plurality of frequency spectra, a respective background noise component based on an amplitude of at least one spectral component of the frequency spectrum at a frequency different from both the carrier frequency of the marker signal 420 and the respective frequencies of the one or more ultrasonic carrier signals 410-1 to 410-8. This variant is useful in cases where the background noise is expected to vary significantly on the timescale of the ultrasonic synchronisation signal (0.5 seconds in the present embodiment), where an estimate of the background noise that has been received at the same time as the ultrasonic synchronisation signal may allow more effective correction of the frequency spectra by the frequency spectrum correction module 348.

Figure 11:
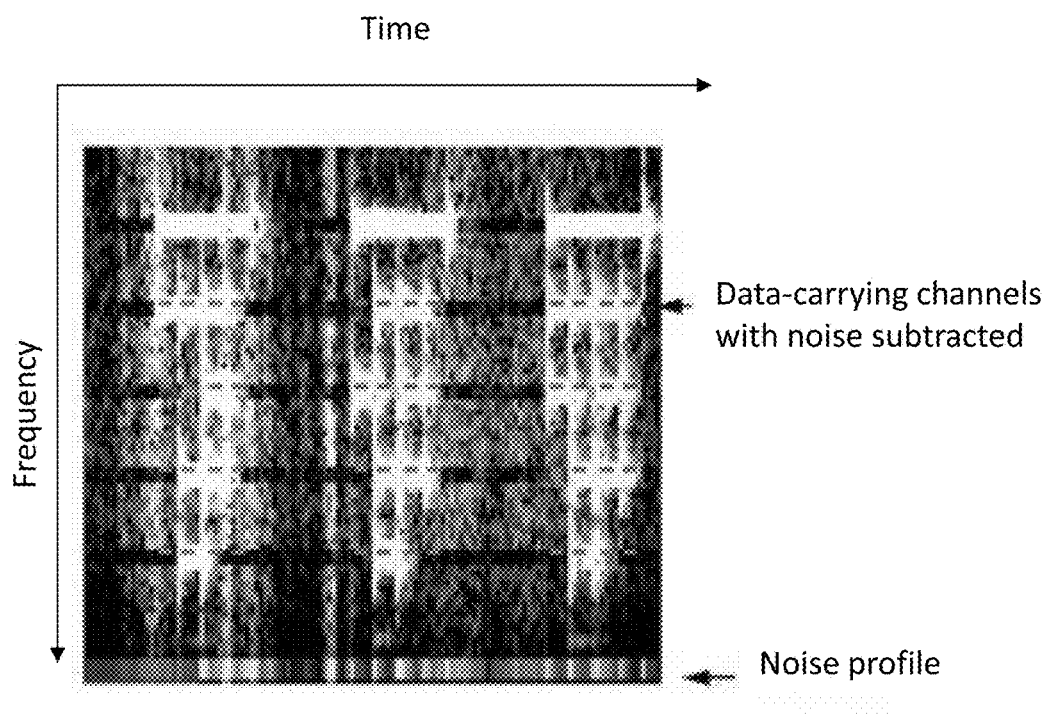
FIG. 11 presents another set of results of processing operations that are performed by the decoding module 340 of FIG. 4 in the form of a spectrogram, where an estimated background noise component has been subtracted from the calculated frequency spectra.

An example of a grid of spectrum data obtained by removing the background noise component is illustrated in FIG. 11. In this example, the illustrated noise profile was determined by sampling and averaging a selection of non-data carrying frequency channels. More particularly, the noise profile was obtained by identifying a set of non-data carrying frequency channels in the spectrogram, and then averaging out the noise profile in those channels to create a background noise profile for the recording, which can be subtracted from each of the data-carrying frequency channels. These techniques of suppressing the adverse effects of background noise allow valid timecode data to be obtained by the portable device 300 in surprisingly noisy environments.

Referring again to FIG. 9, once the frequency spectra have been corrected by removal of the background noise component, the process proceeds to step S350, in which the decoding module 340 uses the portion of the spectrogram corresponding to the marker pulse 420 of the ultrasonic synchronisation signal 400 to determine a threshold level for binarising the corrected frequency spectra of the samples of ultrasonic signal corresponding to the timecode-carrying part 410 of the ultrasonic synchronisation signal 400, in order to generate a representation of the timecode from which the timecode value can be obtained. The threshold level may be regarded as an "amount of signal" that is used to distinguish between a "1" and a "0". The decoding module 340 thus uses the marker pulse 420 to determine both a timing and a sensitivity level used to decode the received ultrasonic synchronisation signals.

The decoding module 340 may determine the threshold level in one of a number of different ways. For example, in the present embodiment, the decoding module 340 calculates a respective duty cycle of the marker pulses in the periodic sequence of ultrasonic synchronisation signals for each of a plurality of candidate values of the threshold level, and selects the threshold level for the binarising process from among the candidate values of the threshold level such that the selected threshold level yields a duty cycle lying within a predetermined range of values of the duty cycle. For example, the selected threshold level may be such that it yields a calculated duty cycle that is within the range of 40 to 60 percent, if the marker pulse is known to be transmitted with a 50 percent duty cycle. Determining the threshold level in this adaptive manner allows the decoding module 340 to effectively extract timecodes from audio signals generated by a variety of sound systems and in different venues.

In step S360, the decoding module 340 performs the binarising process by binarising the corrected frequency spectra of the samples of the ultrasonic signal corresponding to the timecode-carrying part of the digitised ultrasonic synchronisation signal to generate a representation of the corresponding timecode. The representation of the timecode can be regarded as a black and white, two-dimensional checkerboard pattern as shown in FIG. 2, with black portions representing logical values of "1", and white portions representing logical values of "0", for example.

In step S370, the decoding module 340 determines the corresponding timecode based on the representation thereof generated in step S360. More particularly, in step S370, the decoding module 340 identifies the data-carrying segments 412 in the corrected spectral data representing the timecode (which may be visualised as a spectrogram of the kind shown in FIG. 11), for example on the basis of stored indicators of where each data-carrying segment 412 is located within the representation in relation to the marker pulse 420, where each of the stored indicators provides an indication of the frequency channel and a time measured from the beginning of the marker pulse 420 at which a data-carrying segment 412 is located. The decoding module 340 then extracts the corresponding timecode from the identified data-carrying segments 412, e.g. by interpreting data-carrying segments 412 having amplitudes above a certain level as containing a logical "1", and data-carrying segments 412 having amplitudes below that level as containing a logical "0".

Once the timecode value has been determined the decoding module 340 may proceed to validate the decoded data, to reduce the risk of audio content being played back from the wrong point in the film presentation. In the present embodiment, two strategies are employed to validate the decoded data. The first is a 2-bit binary checksum for each timecode-carrying part 410. For the decoded timecode-carrying part 410 to pass the validation, the 14 data-carrying segments should generate a 2-bit parity sum which matches the parity bits in the remainder of the timecode-carrying part 410. Timecodes which fail this parity test are rejected.

The decoding module 340 may, as in the present embodiment, proceed to calculate a refined value of the threshold in step S380, in order to improve subsequent decoding operations. An example of a process by which such a refined value of the threshold level may be determined is illustrated in the flow chart of FIG. 12.

In step S382 of FIG. 12, the decoding module 340 adjusts the determined threshold level (by incrementing it up or down), and uses the adjusted threshold level to decode a timecode-carrying part of a received first ultrasonic synchronisation signal to determine a corresponding first timecode. In step S384, the decoding module 340 uses the adjusted threshold level to decode a timecode-carrying part of a received second ultrasonic synchronisation signal that is different from the first ultrasonic synchronisation signal, to determine a corresponding second timecode. In step S386, the decoding module 340 determines whether the determined first and second timecodes have a predetermined relationship to one another. For example, where the first and second ultrasonic synchronisation signals are received one after the other, with no other ultrasonic synchronisation signal being received in the intervening period (e.g. as illustrated in FIG. 2), the decoding module 340 may determine whether the determined first and second timecodes correspond to integers that differ by 1. If the first and second timecodes are determined not to have the relationship of the required form, steps S382 to S386 are repeated, with the threshold level being appropriately adjusted to a new value in each subsequent performance of step S382. However, if the first and second timecodes are determined to have the predetermined relationship to each other, the process proceeds to step S388, where the decoding module 340 determines the refined value of the threshold level based on a value to which the threshold level has been adjusted in the final performance of step S382.

The refined value may, for example, correspond to the value to which the threshold level has been adjusted in the final, penultimate or earlier performance of step S382, or a value derived from any of these. The decoding module 340 may be arranged to break out of the loop illustrated in FIG. 12 if the answer in step S386 is "no" after the loop has been repeated a predefined number of times, whereupon the decoding module 340 may proceed to acquire and process a different recording from the microphone module 320.

The process illustrated in FIG. 12 also provides a further validity check for the obtained timecode values. If the decoded data passes both the parity test and this further validity check, it may be concluded that the extracted timecode values are valid with a high degree of confidence. For random inputs, the likelihood of false positives is estimated to be less than 1 in 260,000.

[Modifications and Variations]

Many modifications and variations can be made to the embodiments described above.

For example, although the portable device 300 storing the audio content is provided in the form of a smart-phone in the embodiments described above, the portable device 300 may alternatively be provided in other forms, such as a PDA, laptop computer, tablet computer, an mp3 player or other personal music player that is equipped with a microphone, for example.

Figure 13:
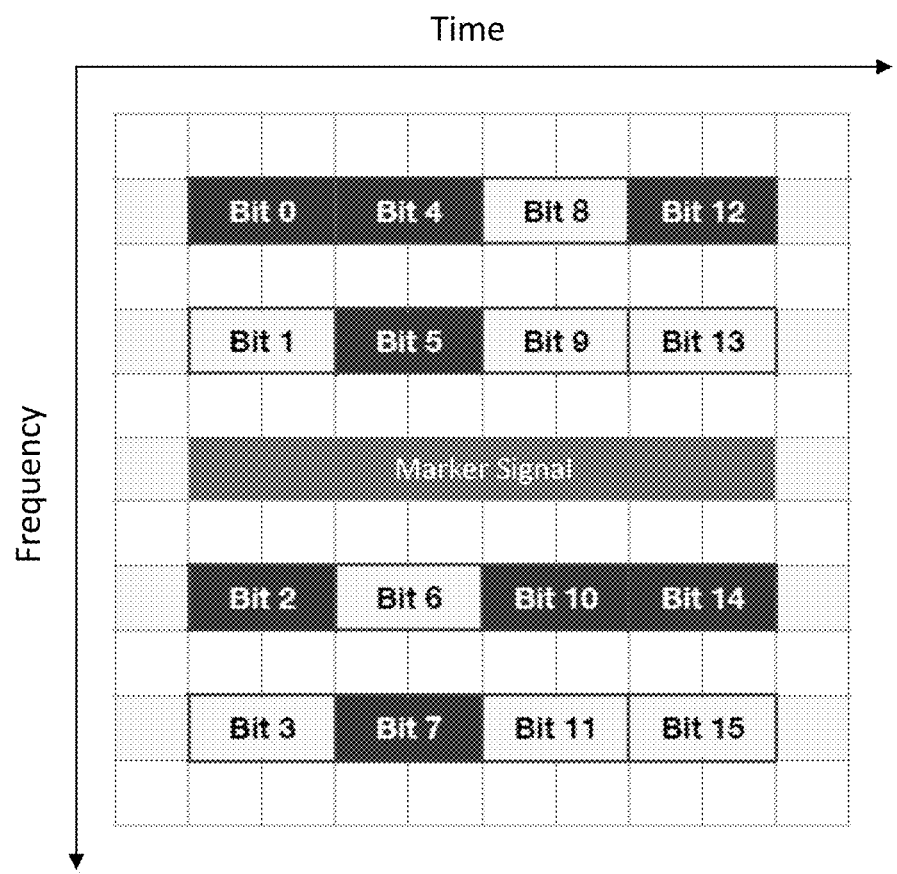
FIG. 13 schematically illustrates an alternative encoding scheme in accordance with which timecodes may be encoded onto a plurality of ultrasonic carrier signals.

In the embodiments described above, the ultrasonic synchronisation signal generator 200 is provided in the form of a cinema sound system. However, the ultrasonic synchronisation signals may more generally be generated by any sound reproduction system that is capable of generating ultrasonic synchronisation signals of the described forms. In this regard, it should be noted that the representation of an ultrasonic synchronisation signal in a spectrogram need not be as illustrated in FIG. 2A. For example, the synchronisation signal may be generated by modulating more or fewer than eight ultrasonic carrier signals, and is not limited to having 14 data-carrying segments 412. Furthermore, where the data-carrying segments 412 of each frequency channel are interleaved with non-data-carrying segments 414, the data carrying segments 412 of one or more adjacent channels may be transmitted conterminously. Further still, in a synchronisation scheme of an alternative embodiment, which may be employed in circumstances where effects such as echoing are not sufficient to warrant the use of any non-data-carrying segments 414, the non-data-carrying segments may be omitted altogether from the ultrasonic synchronisation signal, which may then take the form illustrated in FIG. 13, for example.

In the above-described embodiments, the timecode is taken, by way of example, to represent the number of seconds that have elapsed since the start of the film presentation. However, in other embodiments, where the audio-visual presentation is arranged to begin at a predetermined time, the timecode may simply indicate a clock time with which both the ultrasonic synchronisation signal generator 200 and the portable device 300 are synchronised. This clock time may be kept by the ultrasonic synchronisation signal generator 200 or another device (e.g. a timing server) to which both the ultrasonic synchronisation signal generator 200 and the portable device 300 can connect. In this case, the portable device 300 may simply subtract the known start time of the presentation from the received timecode value and thus calculate the appropriate point in the stored audio content from which to play back the audio content to the user during the presentation.

In order to reject background noise and isolate just those frequencies that contain the timecode data, the signal processing scheme employed in the above-described embodiments makes use of FFT to convert the temporal domain of the recording into the frequency domain. However, in alternative embodiments, which may be used in environments where noise suppression is not required, the signal processing may proceed only in the time domain, with the decoding module 340 performing the binarising process directly on the recorded data, rather than on Fourier transforms thereof.

The foregoing description of embodiments of the present invention has been presented for the purpose of illustration and description. It is not intended to be exhaustive or to limit the invention to the forms disclosed. Alterations, modifications and variations can be made without departing from the spirit and scope of the present invention.

The invention claimed is:

1. An audio-visual presentation system for presenting audio content of an audio-visual presentation in synchronisation with video content of the audio-visual presentation to a viewer of the video content, comprising:
   an ultrasonic synchronisation signal generator arranged to generate a sequence of ultrasonic synchronisation signals during display of the video content, wherein each ultrasonic synchronisation signal comprises:
      a timecode-carrying part that encodes a respective timecode through modulation of one or more ultrasonic carrier signals; and
      an ultrasonic marker signal at a different carrier frequency than the one or more ultrasonic carrier signals,
   wherein the ultrasonic synchronisation signal generator is arranged to transmit the timecode-carrying part and the ultrasonic marker signal of each ultrasonic synchronisation signal conterminously; and
   a portable device for playing the audio content of the audio-visual presentation to the viewer, the portable device comprising:
      a storage device for storing the audio content;
      a microphone module operable to receive and digitise an ultrasonic signal comprising at least one of the ultrasonic synchronisation signals;
      a search module arranged to identify a timecode-carrying part of a digitised ultrasonic synchronisation signal in the digitised ultrasonic signal based on a received ultrasonic marker signal;
      a decoding module arranged to decode the identified timecode-carrying part to determine the corresponding timecode; and a playback module arranged to determine a playback point in the stored audio content based on the determined timecode and play the stored audio content to the viewer from the determined playback point such that the audio content is played in synchronisation with the displayed video content.

2. An audio-visual presentation system according to claim 1, wherein:
the ultrasonic synchronisation signal generator is arranged to generate a periodic sequence of the ultrasonic synchronisation signals;
the ultrasonic marker signal in each of the ultrasonic synchronisation signals comprises a marker pulse whose leading edge coincides with one end of the timecode-carrying part of the ultrasonic synchronisation signal, and whose trailing edge coincides with the other end of the timecode-carrying part of the ultrasonic synchronisation signal; and
the decoding module is arranged to decode the identified timecode-carrying part of the digitised ultrasonic synchronisation signal by using the marker pulse of the digitised ultrasonic synchronisation signal to determine a threshold level for performing a binarising process, said binarising process being based on the identified timecode-carrying part, and performing the binarising process using the determined threshold level to determine the corresponding timecode.

3. An audio-visual presentation system according to claim 2, wherein the decoding module is arranged to calculate a respective duty cycle of the marker pulses in the periodic sequence of ultrasonic synchronisation signals for each of a plurality of candidate values of the threshold level, and select the threshold level for the binarising process from among the candidate values of the threshold level such that the selected threshold level yields a duty cycle lying within a predetermined range of values of the duty cycle.

4. An audio-visual presentation system according to claim 2, wherein the ultrasonic synchronisation signal generator is arranged to transmit the timecode-carrying part of each ultrasonic synchronisation signal at a plurality of ultrasonic frequencies, and to transmit the marker pulse of each ultrasonic synchronisation signal at another ultrasonic frequency that is in a central portion of an ultrasonic frequency band comprising said plurality of ultrasonic frequencies.

5. An audio-visual presentation system according to claim 2, wherein the decoding module is arranged to calculate a refined value of the threshold level for the binarising process by:
(i) adjusting the determined threshold level and using the adjusted threshold level to decode a timecode-carrying part of a first ultrasonic synchronisation signal received from the ultrasonic synchronisation signal generator to determine a corresponding first timecode;
(ii) using the adjusted threshold level to decode a timecode-carrying part of a second ultrasonic synchronisation signal received from the ultrasonic synchronisation signal generator that is different from the first ultrasonic synchronisation signal, to determine a corresponding second timecode;
(iii) determining whether the determined first and second timecodes have a predetermined relationship to one another; and
(iv) repeating processes (i) to (iii) until the first and second timecodes are determined to have the predetermined relationship to one another, and determining the refined value of the threshold level based on a value to which the determined threshold level has been adjusted in the final performance of process (i), and
wherein the decoding module is arranged to perform the binarising process using the refined value of the threshold level to determine the corresponding timecode.

6. An audio-visual presentation system according to claim 2, wherein the decoding module comprises:
a sampling module arranged to sample the digitised ultrasonic signal; and
a frequency spectrum calculation module arranged to calculate a frequency spectrum of each sample of the ultrasonic signal,
wherein the decoding module is arranged to perform the binarising process to determine the corresponding timecode by:
binarising the frequency spectra of the samples of the ultrasonic signal corresponding to the timecode-carrying part of the digitised ultrasonic synchronisation signal to generate a representation of the corresponding timecode; and
determining the corresponding timecode based on the generated representation thereof.

7. An audio-visual presentation system according to claim 6, wherein the decoding module further comprises:
a background noise estimation module arranged to estimate a respective background noise component of each of the plurality of frequency spectra; and
a frequency spectrum correction module arranged to correct each of the frequency spectra by removing therefrom the corresponding estimate of the background noise component to generate a corrected frequency spectrum of each sample,
wherein the decoding module is arranged to perform the binarising process to determine the corresponding timecode by:
binarising the corrected frequency spectra of the samples of the ultrasonic signal corresponding to the timecode-carrying part of the ultrasonic synchronisation signal to generate a representation of the corresponding timecode; and
determining the corresponding timecode based on the generated representation thereof.

8. An audio-visual presentation system according to claim 7, wherein the background noise estimation module is arranged to estimate, for each frequency spectrum in the plurality of frequency spectra, a respective background noise component based on an amplitude of at least one spectral component of the frequency spectrum at a frequency different from both the carrier frequency of the marker signal and the respective frequencies of the one or more ultrasonic carrier signals.

9. An audio-visual presentation system according to claim 7, wherein the background noise estimation module is arranged to estimate, for each frequency spectrum in the plurality of frequency spectra, a respective background noise component based on an amplitude of at least one spectral component of a different frequency spectrum in the plurality of frequency spectra, the different frequency spectrum having been derived from a sample of the ultrasonic signal between two adjacent ultrasonic synchronisation signals in the sequence of ultrasonic synchronisation signals.

10. An audio-visual presentation system according to claim 1, wherein:
the ultrasonic synchronisation signal generator is arranged to generate the timecode-carrying part of each ultrasonic synchronisation signal by amplitude modulating a first ultrasonic carrier signal to encode a logical "1" or a logical "0" in each of a plurality of data-carrying segments of the modulated first ultrasonic carrier signal that encode the timecode, and transmitting the data-carrying segments such that each of the data carrying segments is followed by a non-data-carrying segment in which the amplitude of the first ultrasonic carrier signal does not exceed a predetermined threshold; and the decoding module is arranged to decode the identified timecode-carrying part by identifying the data-carrying segments in the identified timecode-carrying part of the ultrasonic synchronisation signal, and extracting the corresponding timecode from the identified data-carrying segments.

11. An audio-visual presentation system according to claim 10, wherein:

the ultrasonic synchronisation signal generator is further arranged to generate the timecode-carrying part of each ultrasonic synchronisation signal by amplitude modulating a second ultrasonic carrier signal to encode a logical "1" or a logical "0" in each of a plurality of data-carrying segments of the modulated second ultrasonic carrier signal which, together with the data-carrying segments of the amplitude modulated first ultrasonic carrier signal, encode the timecode, and transmitting the data-carrying segments of the amplitude modulated first and second ultrasonic carrier signals such that:

each of the data carrying segments of the amplitude modulated second ultrasonic carrier signal is followed by a non-data-carrying segment in which the amplitude of the second ultrasonic carrier signal does not exceed a predetermined threshold;

the data-carrying segments of the modulated second ultrasonic carrier signal are transmitted conterminously with the non-data-carrying segments of the amplitude modulated first ultrasonic carrier signal; and the data-carrying segments of the modulated first ultrasonic carrier signal are transmitted conterminously with the non-data-carrying segments of the amplitude modulated second ultrasonic carrier signal; and the decoding module is arranged to decode the identified timecode-carrying part by identifying the data-carrying segments of the amplitude modulated first and second ultrasonic carrier signals in the identified timecode-carrying part of the ultrasonic synchronisation signal, and extracting the corresponding timecode from the identified data-carrying segments.

12. An ultrasonic synchronisation signal generator for use in an audio-visual presentation system comprising a display device for displaying video content of an audio-visual presentation and a portable device for playing audio content of the audio-visual presentation to a viewer of the video content, the ultrasonic synchronisation signal generator storing an ultrasonic synchronisation signal soundtrack which, when played by the ultrasonic synchronisation signal generator, comprises a sequence of ultrasonic synchronisation signals for synchronising playback of the audio content by the portable device with the displayed video content, wherein each ultrasonic synchronisation signal comprises:

a timecode-carrying part that encodes a respective timecode through modulation of one or more ultrasonic carrier signals; and an ultrasonic marker signal at a different carrier frequency than the one or more ultrasonic carrier signals, wherein the ultrasonic synchronisation signal generator is arranged to transmit the timecode-carrying part and the ultrasonic marker signal of each ultrasonic synchronisation signal conterminously.

13. An ultrasonic synchronisation signal generator according to claim 12, wherein:

the stored ultrasonic synchronisation signal soundtrack, when played by the ultrasonic synchronisation signal generator, comprises a periodic sequence of the ultrasonic synchronisation signals; and the ultrasonic marker signal in each of the ultrasonic synchronisation signals comprises a marker pulse whose leading edge coincides with one end of the timecode-carrying part of the ultrasonic synchronisation signal, and whose trailing edge coincides with the other end of the timecode-carrying part of the ultrasonic synchronisation signal.

14. An ultrasonic synchronisation signal generator according to claim 13, wherein the ultrasonic synchronisation signal generator is arranged to transmit the timecode-carrying part of each ultrasonic synchronisation signal at a plurality of ultrasonic frequencies, and to transmit the marker pulse of each ultrasonic synchronisation signal at another ultrasonic frequency that is in a central portion of an ultrasonic frequency band comprising said plurality of ultrasonic frequencies.

15. An ultrasonic synchronisation signal generator according to claim 12, wherein the ultrasonic synchronisation signal generator is arranged to generate the timecode-carrying part of each ultrasonic synchronisation signal by amplitude modulating a first ultrasonic carrier signal to encode a logical "1" or a logical "0" in each of a plurality of data-carrying segments of the modulated first ultrasonic carrier signal that encode the timecode, and transmitting the data-carrying segments such that each of the data carrying segments is followed by a non-data-carrying segment in which the amplitude of the first ultrasonic carrier signal does not exceed a predetermined threshold.

16. An ultrasonic synchronisation signal generator according to claim 15, wherein the ultrasonic synchronisation signal generator is further arranged to generate the timecode-carrying part of each ultrasonic synchronisation signal by amplitude modulating a second ultrasonic carrier signal to encode a logical "1" or a logical "0" in each of a plurality of data-carrying segments of the modulated second ultrasonic carrier signal which, together with the data-carrying segments of the amplitude modulated first ultrasonic carrier signal, encode the timecode, and transmitting the data-carrying segments of the amplitude modulated first and second ultrasonic carrier signals such that:

each of the data carrying segments of the amplitude modulated second ultrasonic carrier signal is followed by a non-data-carrying segment in which the amplitude of the second ultrasonic carrier signal does not exceed a predetermined threshold;

the data-carrying segments of the modulated second ultrasonic carrier signal are transmitted conterminously with the non-data-carrying segments of the amplitude modulated first ultrasonic carrier signal; and the data-carrying segments of the modulated first ultrasonic carrier signal are transmitted conterminously with the non-data-carrying segments of the amplitude modulated second ultrasonic carrier signal.

17. A portable device for playing audio content of an audio-visual presentation to a viewer of video content of the audio-visual presentation, wherein the portable device is arranged to synchronise playback of the audio content with the displayed video content based on at least one received ultrasonic synchronisation signal, and comprises:
- a storage device for storing the audio content of the audio-visual presentation;
- a microphone module operable to receive and digitise an ultrasonic signal comprising the at least one ultrasonic synchronisation signal, the at least one ultrasonic synchronisation signal comprising:
  - a timecode-carrying part that encodes a respective timecode through modulation of one or more ultrasonic carrier signals; and
  - an ultrasonic marker signal at a different carrier frequency than the one or more ultrasonic carrier signals, the ultrasonic marker signal being conterminous with the timecode-carrying part;
- a search module arranged to identify the timecode-carrying part of a digitised ultrasonic synchronisation signal in the digitised ultrasonic signal based on a received ultrasonic marker signal;
- a decoding module arranged to decode the identified timecode-carrying part to determine the corresponding timecode; and
- a playback module arranged to determine a playback point in the stored audio content based on the determined timecode and play the stored audio content to the viewer from the determined playback point such that the audio content is played in synchronisation with the video content.

18. A portable device according to claim 17, wherein:
the microphone module is operable to receive and digitise an ultrasonic signal comprising a periodic sequence of the ultrasonic synchronisation signals;
the ultrasonic marker signal in each of the ultrasonic synchronisation signals comprises a marker pulse whose leading edge coincides with one end of the timecode-carrying part of the ultrasonic synchronisation signal, and whose trailing edge coincides with the other end of the timecode-carrying part of the ultrasonic synchronisation signal; and
the decoding module is arranged to decode the identified timecode-carrying part of the digitised ultrasonic synchronisation signal by using the marker pulse of the digitised ultrasonic synchronisation signal to determine a threshold level for performing a binarising process, said binarising process being based on the identified timecode-carrying part, and performing the binarising process using the determined threshold level to determine the corresponding timecode.

19. A portable device according to claim 18, wherein the decoding module is arranged to determine the threshold level for the binarising process by calculating a respective duty cycle of the marker pulses in the periodic sequence of ultrasonic synchronisation signals for each of a plurality of candidate values of the threshold level, and selecting the threshold level for the binarising process from among the candidate values of the threshold level such that the selected threshold level yields a duty cycle lying within a predetermined range of values of the duty cycle.

20. A portable device according to claim 18, wherein the microphone module is arranged to:
- receive the timecode-carrying part of each ultrasonic synchronisation signal over a plurality of ultrasonic frequencies;
- receive the marker pulse of each ultrasonic synchronisation signal at another ultrasonic frequency that is in a central portion of an ultrasonic frequency band comprising said plurality of ultrasonic frequencies; and
- digitise the received timecode-carrying parts and the received marker pulses.

21. A portable device according to claim 18, wherein the decoding module is arranged to calculate a refined value of the threshold level for the binarising process by:
(i) adjusting the determined threshold level and using the adjusted threshold level to decode a timecode-carrying part of a received first ultrasonic synchronisation signal to determine a corresponding first timecode;
(ii) using the adjusted threshold level to decode a timecode-carrying part of a received second ultrasonic synchronisation signal that is different from the first ultrasonic synchronisation signal, to determine a corresponding second timecode;
(iii) determining whether the determined first and second timecodes have a predetermined relationship to one another; and
(iv) repeating processes (i) to (iii) until the first and second timecodes are determined to have the predetermined relationship to one another, and determining the refined value of the threshold level based on a value to which the determined threshold level has been adjusted in the final performance of process (i), and
wherein the decoding module is arranged to perform the binarising process using the refined value of the threshold level to determine the corresponding timecode.

22. A portable device according to claim 18, wherein the decoding module comprises:
- a sampling module arranged to sample the digitised ultrasonic signal; and
- a frequency spectrum calculation module arranged to calculate a frequency spectrum of each sample of the ultrasonic signal,
wherein the decoding module is arranged to perform the binarising process to determine the corresponding timecode by:
- binarising the frequency spectra of the samples of the ultrasonic signal corresponding to the timecode-carrying part of the digitised ultrasonic synchronisation signal to generate a representation of the corresponding timecode; and
- determining the corresponding timecode based on the generated representation thereof.

23. A portable device according to claim 22, wherein the decoding module further comprises:
- a background noise estimation module arranged to estimate a respective background noise component of each of the plurality of frequency spectra; and
- a frequency spectrum correction module arranged to correct each of the frequency spectra by removing therefrom the corresponding estimate of the background noise component to generate a corrected frequency spectrum of each sample,
wherein the decoding module is arranged to perform the binarising process and determine the corresponding timecode by:
- binarising the corrected frequency spectra of the samples of the ultrasonic signal corresponding to the timecode-carrying part of the ultrasonic synchronisation signal to generate a representation of the corresponding timecode; and
- determining the corresponding timecode based on the generated representation thereof.

24. A portable device according to claim 23, wherein the background noise estimation module is arranged to estimate, for each frequency spectrum in the plurality of frequency spectra, a respective background noise component based on an amplitude of at least one spectral component of the frequency spectrum at a frequency different from both the carrier frequency of the marker signal and the respective frequencies of the one or more ultrasonic carrier signals.

25. A portable device according to claim 23, wherein the background noise estimation module is arranged to estimate, for each frequency spectrum in the plurality of frequency spectra, a respective background noise component based on an amplitude of at least one spectral component of a different frequency spectrum in the plurality of frequency spectra, the different frequency spectrum having been derived from a sample of the ultrasonic signal between two adjacent ultrasonic synchronisation signals in the sequence of ultrasonic synchronisation signals.

26. A portable device according to claim 17, wherein:
the microphone module is operable to receive and digitise a first ultrasonic carrier signal which has been amplitude modulated to encode a logical "1" or a logical "0" in each of a plurality of data-carrying segments of the amplitude modulated first ultrasonic carrier signal, wherein each of the data carrying segments is followed by a non-data-carrying segment in which the amplitude of the first ultrasonic carrier signal does not exceed a predetermined threshold; and
the decoding module is arranged to decode the identified timecode-carrying part by identifying the data-carrying segments in the identified timecode-carrying part of the ultrasonic synchronisation signal, and extracting the corresponding timecode from the identified data-carrying segments.

27. A portable device according to claim 26, wherein:
the microphone module is further operable to receive and digitise a second ultrasonic carrier signal which has been amplitude modulated to encode a logical "1" or a logical "0" in each of a plurality of data-carrying segments of the amplitude modulated second ultrasonic carrier signal, which, together with the data-carrying segments of the amplitude modulated first ultrasonic carrier signal, encode the timecode, wherein:
each of the data carrying segments of the amplitude modulated second ultrasonic carrier signal is followed by a non-data-carrying segment in which the amplitude of the second ultrasonic carrier signal does not exceed a predetermined threshold;
the data-carrying segments of the amplitude modulated second ultrasonic carrier signal are conterminous with the non-data-carrying segments of the amplitude modulated first ultrasonic carrier signal; and
the data-carrying segments of the amplitude modulated first ultrasonic carrier signal are conterminous with the non-data-carrying segments of the amplitude modulated second ultrasonic carrier signal; and
the decoding module is arranged to decode the identified timecode-carrying part by identifying the data-carrying segments of the amplitude modulated first and second ultrasonic carrier signals in the identified timecode-carrying part of the ultrasonic synchronisation signal, and extracting the corresponding timecode from the identified data-carrying segments.

28. A method of playing audio content of an audio-visual presentation to a viewer of video content of the audio-visual presentation in synchronisation with the video content, wherein playback of the audio content is synchronised with the displayed video content based on at least one ultrasonic synchronisation signal received during display of the video content, the method comprising:

receiving and digitising an ultrasonic signal comprising the at least one ultrasonic synchronisation signal, the at least one ultrasonic synchronisation signal comprising:
a timecode-carrying part that encodes a respective timecode through modulation of one or more ultrasonic carrier signals; and
an ultrasonic marker signal at a different carrier frequency than the one or more ultrasonic carrier signals, the ultrasonic marker signal being conterminous with the timecode-carrying part;
identifying the timecode-carrying part of a digitised ultrasonic synchronisation signal in the digitised ultrasonic signal based on a received ultrasonic marker signal;
decoding the identified timecode-carrying part to determine the corresponding timecode;
determining a playback point in a stored audio content based on the determined timecode; and
playing the stored audio content from the determined playback point such that the audio content is played in synchronisation with the video content.

29. A method according to claim 28, wherein:
an ultrasonic signal comprising a periodic sequence of the ultrasonic synchronisation signals is received and digitised;
the ultrasonic marker signal in each of the ultrasonic synchronisation signals comprises a marker pulse whose leading edge coincides with one end of the timecode-carrying part of the ultrasonic synchronisation signal, and whose trailing edge coincides with the other end of the timecode-carrying part of the ultrasonic synchronisation signal;
decoding the identified timecode-carrying part comprises using the marker pulse of the digitised ultrasonic synchronisation signal to determine a threshold level for performing a binarising process, said binarising process being based on the identified timecode-carrying part, and performing the binarising process using the determined threshold level to determine the corresponding timecode.

30. A method according to claim 29, wherein the threshold level is determined by:
calculating a respective duty cycle of the marker pulses in the periodic sequence of ultrasonic synchronisation signals for each of a plurality of candidate values of the threshold level; and
selecting the threshold level for the binarising process from among the candidate values of the threshold level such that the selected threshold level yields a duty cycle lying within a predetermined range of values of the duty cycle.

31. A method according to claim 29, wherein:
the timecode-carrying part of each ultrasonic synchronisation signal is received over a plurality of ultrasonic frequencies; and
the marker pulse of each ultrasonic synchronisation signal is received at another ultrasonic frequency that is in a central portion of an ultrasonic frequency band comprising said plurality of ultrasonic frequencies.

32. A method according to claim 29, further comprising calculating a refined value of the threshold level for the binarising process by:
(i) adjusting the determined threshold level and using the adjusted threshold level to decode a timecode-carrying part of a received first ultrasonic synchronisation signal to determine a corresponding first timecode;
(ii) using the adjusted threshold level to decode a timecode-carrying part of a received second ultrasonic synchronisation signal that is different from the first ultrasonic synchronisation signal, to determine a corresponding second timecode;

(iii) determining whether the determined first and second timecodes have a predetermined relationship to one another; and (iv) repeating processes (i) to (iii) until the first and second timecodes are determined to have the predetermined relationship to one another, and determining the refined value of the threshold level based on a value to which the determined threshold level has been adjusted in the final performance of process (i), wherein the binarising process is performed using the refined value of the threshold level to determine the corresponding timecode.

33. A method according to claim 29, wherein the identified timecode-carrying part is decoded to determine the corresponding timecode by:

sampling the digitised ultrasonic signal;

calculating a frequency spectrum of each sample of the ultrasonic signal;

performing the binarising process by binarising the frequency spectra of the samples of the ultrasonic signal corresponding to the timecode-carrying part of the digitised ultrasonic synchronisation signal to generate a representation of the corresponding timecode; and determining the corresponding timecode based on the generated representation thereof.

34. A method according to claim 33, wherein the identified timecode-carrying part is decoded to determine the corresponding timecode by the further processes of:

estimating a respective background noise component of each of the plurality of frequency spectra;

correcting each of the frequency spectra by removing therefrom the corresponding estimate of the background noise component to generate a corrected frequency spectrum of each sample, wherein the corrected frequency spectra of the samples of the ultrasonic signal corresponding to the timecode-carrying part of the digitised ultrasonic synchronisation signal are binarised to generate the representation of the corresponding timecode.

35. A method according to claim 34, wherein the respective background noise component of each of the plurality of frequency spectra is estimated by estimating, for each frequency spectrum in the plurality of frequency spectra, a respective background noise component based on an amplitude of at least one spectral component of the frequency spectrum at a frequency different from both the carrier frequency of the marker signal and the respective frequencies of the one or more ultrasonic carrier signals.

36. A method according to claim 34, wherein the respective background noise component of each of the plurality of frequency spectra is estimated by estimating, for each frequency spectrum in the plurality of frequency spectra, a respective background noise component based on an amplitude of at least one spectral component of a different frequency spectrum in the plurality of frequency spectra, the different frequency spectrum having been derived from a sample of the ultrasonic signal between two adjacent ultrasonic synchronisation signals in the sequence of ultrasonic synchronisation signals.

37. A method according to claim 28, wherein:

receiving and digitising the ultrasonic signal comprises receiving and digitising a first ultrasonic carrier signal which has been amplitude modulated to encode a logical "1" or a logical "0" in each of a plurality of data-carrying segments of the amplitude modulated first ultrasonic carrier signal, wherein each of the data carrying segments is followed by a non-data-carrying segment in which the amplitude of the first ultrasonic carrier signal does not exceed a predetermined threshold; and decoding the identified timecode-carrying part to determine the corresponding timecode comprises identifying the data-carrying segments in the identified timecode-carrying part, and extracting the corresponding timecode from the identified data-carrying segments.

38. A method according to claim 37, wherein:

receiving and digitising the ultrasonic signal further comprises receiving and digitising a second ultrasonic carrier signal which has been amplitude modulated to encode a logical "1" or a logical "0" in each of a plurality of data-carrying segments of the amplitude modulated second ultrasonic carrier signal, which, together with the data-carrying segments of the amplitude modulated first ultrasonic carrier signal, encode the timecode, wherein:

each of the data carrying segments of the amplitude modulated second ultrasonic carrier signal is followed by a non-data-carrying segment in which the amplitude of the second ultrasonic carrier signal does not exceed a predetermined threshold;

the data-carrying segments of the amplitude modulated second ultrasonic carrier signal are conterminous with the non-data-carrying segments of the amplitude modulated first ultrasonic carrier signal;

the data-carrying segments of the amplitude modulated first ultrasonic carrier signal are conterminous with the non-data-carrying segments of the amplitude modulated second ultrasonic carrier signal; and decoding the identified timecode-carrying part to determine the corresponding timecode comprises identifying the data-carrying segments of the amplitude modulated first and second ultrasonic carrier signals in the identified timecode-carrying part, and extracting the corresponding timecode from the identified data-carrying segments.

39. A non-transitory storage medium storing computer program instructions which, when executed by a processor of a processing device, cause the processing device to play audio in synchronisation with video that is displayed by a separate device, the computer program instructions, when executed, causing the processing device to play the audio by:

digitising a received ultrasonic signal comprising at least one ultrasonic synchronisation signal, the at least one ultrasonic synchronisation signal comprising:

a timecode-carrying part that encodes a respective timecode through modulation of one or more ultrasonic carrier signals; and an ultrasonic marker signal at a different carrier frequency than the one or more ultrasonic carrier signals, the ultrasonic marker signal being conterminous with the timecode-carrying part;

identifying the timecode-carrying part of a digitised ultrasonic synchronisation signal in the digitised ultrasonic signal based on a received ultrasonic marker signal;

decoding the identified timecode-carrying part to determine the corresponding timecode;

determining a playback point in stored audio based on the determined timecode; and playing the stored audio from the determined playback point such that the audio is played in synchronisation with the video.

40. A non-transitory storage medium according to claim 39, wherein the computer program instructions, when executed, cause the processing device to:
- digitise a received ultrasonic signal comprising a periodic sequence of the ultrasonic synchronisation signals, wherein the ultrasonic marker signal in each of the ultrasonic synchronisation signals comprises a marker pulse whose leading edge coincides with one end of the timecode-carrying part of the ultrasonic synchronisation signal, and whose trailing edge coincides with the other end of the timecode-carrying part of the ultrasonic synchronisation signal; and
- decode the identified timecode-carrying part by using the marker pulse of the digitised ultrasonic synchronisation signal to determine a threshold level for performing a binarising process, said binarising process being based on the identified timecode-carrying part, and performing the binarising process using the determined threshold level to determine the corresponding timecode.

41. A non-transitory storage medium according to claim 40, wherein the computer program instructions, when executed, cause the processing device to determine the threshold level by:
- calculating a respective duty cycle of the marker pulses in the periodic sequence of ultrasonic synchronisation signals for each of a plurality of candidate values of the threshold level; and
- selecting the threshold level for the binarising process from among the candidate values of the threshold level such that the selected threshold level yields a duty cycle lying within a predetermined range of values of the duty cycle.

42. A non-transitory storage medium according to claim 40, wherein:
- the timecode-carrying part of each ultrasonic synchronisation signal is received over a plurality of ultrasonic frequencies; and
- the marker pulse of each ultrasonic synchronisation signal is received at another ultrasonic frequency that is in a central portion of an ultrasonic frequency band comprising said plurality of ultrasonic frequencies.

43. A non-transitory storage medium according to claim 40, wherein the computer program instructions, when executed, further cause the processing device to calculate a refined value of the threshold level for the binarising process by:
(i) adjusting the determined threshold level and using the adjusted threshold level to decode a timecode-carrying part of a received first ultrasonic synchronisation signal to determine a corresponding first timecode;
(ii) using the adjusted threshold level to decode a timecode-carrying part of a received second ultrasonic synchronisation signal that is different from the first ultrasonic synchronisation signal, to determine a corresponding second timecode;
(iii) determining whether the determined first and second timecodes have a predetermined relationship to one another; and
(iv) repeating processes (i) to (iii) until the first and second timecodes are determined to have the predetermined relationship to one another, and determining the refined value of the threshold level based on a value to which the determined threshold level has been adjusted in the final performance of process (i),
and wherein the computer program instructions, when executed, cause the processing device to perform the binarising process using the refined value of the threshold level to determine the corresponding timecode.

44. A non-transitory storage medium according to claim 40, wherein the computer program instructions, when executed, cause the processing device to decode the identified timecode-carrying part to determine the corresponding timecode by:
- sampling the digitised ultrasonic signal;
- calculating a frequency spectrum of each sample of the ultrasonic signal;
- performing the binarising process by binarising the frequency spectra of the samples of the ultrasonic signal corresponding to the timecode-carrying part of the digitised ultrasonic synchronisation signal to generate a representation of the corresponding timecode; and
- determining the corresponding timecode based on the generated representation thereof.

45. A non-transitory storage medium according to claim 44, wherein the computer program instructions, when executed, cause the processing device to decode the identified timecode-carrying part to determine the corresponding timecode by the further processes of:
- estimating a respective background noise component of each of the plurality of frequency spectra;
- correcting each of the frequency spectra by removing therefrom the corresponding estimate of the background noise component to generate a corrected frequency spectrum of each sample,
wherein the corrected frequency spectra of the samples of the ultrasonic signal corresponding to the timecode-carrying part of the digitised ultrasonic synchronisation signal are binarised to generate the representation of the corresponding timecode.

46. A non-transitory storage medium according to claim 45, wherein the computer program instructions, when executed, cause the processing device to estimate the respective background noise component of each of the plurality of frequency spectra by estimating, for each frequency spectrum in the plurality of frequency spectra, a respective background noise component based on an amplitude of at least one spectral component of the frequency spectrum at a frequency different from both the carrier frequency of the marker signal and the respective frequencies of the one or more ultrasonic carrier signals.

47. A non-transitory storage medium according to claim 45, wherein the computer program instructions, when executed, cause the processing device to estimate the respective background noise component of each of the plurality of frequency spectra by estimating, for each frequency spectrum in the plurality of frequency spectra, a respective background noise component based on an amplitude of at least one spectral component of a different frequency spectrum in the plurality of frequency spectra, the different frequency spectrum having been derived from a sample of the ultrasonic signal between two adjacent ultrasonic synchronisation signals in the sequence of ultrasonic synchronisation signals.

48. A non-transitory storage medium according to claim 39, wherein the computer program instructions, when executed, cause the processing device to:
- digitise a first received ultrasonic carrier signal which has been amplitude modulated to encode a logical "1" or a logical "0" in each of a plurality of data-carrying segments of the amplitude modulated first ultrasonic carrier signal, wherein each of the data carrying segments is followed by a non-data-carrying segment in which the amplitude of the first ultrasonic carrier signal does not exceed a predetermined threshold; and decode the identified timecode-carrying part to determine the corresponding timecode by identifying the data-carrying segments in the identified timecode-carrying part, and extracting the corresponding timecode from the identified data-carrying segments.

49. A non-transitory storage medium according to claim 48, wherein the computer program instructions, when executed, cause the processing device to:

digitise a second received ultrasonic carrier signal which has been amplitude modulated to encode a logical "1" or a logical "0" in each of a plurality of data-carrying segments of the amplitude modulated second ultrasonic carrier signal, which, together with the data-carrying segments of the amplitude modulated first ultrasonic carrier signal, encode the timecode, wherein:

each of the data carrying segments of the amplitude modulated second ultrasonic carrier signal is followed by a non-data-carrying segment in which the amplitude of the second ultrasonic carrier signal does not exceed a predetermined threshold;

the data-carrying segments of the amplitude modulated second ultrasonic carrier signal are conterminous with the non-data-carrying segments of the amplitude modulated first ultrasonic carrier signal;

the data-carrying segments of the amplitude modulated first ultrasonic carrier signal are conterminous with the non-data-carrying segments of the amplitude modulated second ultrasonic carrier signal; and decode the identified timecode-carrying part to determine the corresponding timecode by identifying the data-carrying segments of the amplitude modulated first and second ultrasonic carrier signals in the identified timecode-carrying part, and extracting the corresponding timecode from the identified data-carrying segments.

* * * * *